(12) United States Patent
Boudville

(10) Patent No.: US 8,821,277 B2
(45) Date of Patent: Sep. 2, 2014

(54) COLOUR BARCODES AND CELLPHONE

(76) Inventor: Wesley John Boudville, Los Angeles, CA (US)

( * ) Notice: Subject to any disclaimer, the term of this patent is extended or adjusted under 35 U.S.C. 154(b) by 308 days.

(21) Appl. No.: 13/374,207

(22) Filed: Dec. 16, 2011

(65) Prior Publication Data

US 2013/0157760 A1    Jun. 20, 2013

(51) Int. Cl.
*A63F 13/00* (2014.01)

(52) U.S. Cl.
USPC ........ 463/31; 235/375; 235/379; 235/462.04; 235/494

(58) Field of Classification Search
CPC ......... A63F 13/02; A63F 13/06; A63F 13/10; A63F 13/00; G06K 7/0095; G06K 7/10821; G06K 7/1413; G06K 7/1417; G06K 7/1421; G06K 7/1426; G06K 7/1452; G06K 19/06037; G06K 7/12; G06Q 20/3274; G06Q 20/3276; G06Q 19/06028; G06F 17/30879; G06F 17/30725
USPC ........... 463/11–13, 17–19, 16, 20, 25, 26–28, 463/29, 30, 31, 40–42, 43; 235/375, 379, 235/462.04, 494
See application file for complete search history.

(56) References Cited

U.S. PATENT DOCUMENTS

| | | | | |
|---|---|---|---|---|
| 4,857,904 A | * | 8/1989 | Schoon | ...................... 345/469.1 |
| 5,726,435 A | | 3/1998 | Hara | |
| 5,926,015 A | * | 7/1999 | Pharr | ............................ 324/114 |
| 5,933,525 A | * | 8/1999 | Makhoul et al. | ............... 382/186 |
| 5,962,834 A | * | 10/1999 | Markman | ...................... 235/385 |
| 5,988,897 A | * | 11/1999 | Pierce et al. | ...................... 400/61 |
| 6,115,508 A | | 9/2000 | Lopresti | |
| 6,424,342 B1 | * | 7/2002 | Perlman et al. | ............... 345/418 |
| 6,631,012 B2 | | 10/2003 | Athens | |
| 6,641,037 B2 | * | 11/2003 | Williams | ...................... 235/383 |
| 6,669,087 B2 | * | 12/2003 | Wiklof et al. | ................. 235/383 |
| 6,865,608 B2 | * | 3/2005 | Hunter | .......................... 709/229 |
| 7,261,235 B2 | * | 8/2007 | Barenburg et al. | ........... 235/375 |
| 7,287,696 B2 | | 10/2007 | Attia | |
| 7,478,746 B2 | | 1/2009 | Cattrone | |
| 7,693,744 B2 | * | 4/2010 | Forbes | ....................... 705/14.64 |
| 8,196,832 B2 | * | 6/2012 | Soule et al. | .............. 235/462.01 |
| 8,218,207 B1 | * | 7/2012 | Harrison, Jr. | .................. 358/518 |

(Continued)

OTHER PUBLICATIONS

U.S. Appl. No. 61/515,728, published as U.S. pre-grant publication 2013/0032634 A1.*

(Continued)

*Primary Examiner* — David L Lewis
*Assistant Examiner* — Matthew D Hoel
(74) *Attorney, Agent, or Firm* — Steinfl & Bruno, LLP

(57) ABSTRACT

A two dimensional barcode with default background and foreground colors uses other foreground colors, to make separate means of encoding data, used by decoding hardware and software, or by an observer's perception. The new colors show text or graphics. A barcode on a dynamic display shows a progress indicator for an operation started by a user who imaged the barcode with her phone. Or it shows the number of votes for users who picked it with their phones. The barcode could show scrolling text. A barcode on a computer screen simulates a pushbutton; pressed when the user takes a photo of it with a cellphone. Suppose a barcode has a symbol drawn on its foreground rectangles, and the barcode encodes a URL. The URL is crafted to maximize the number of foreground rectangles that the symbol intersects, helping a human interpolate the symbol from fragments.

6 Claims, 7 Drawing Sheets

QR Code

Data Matrix

(56) References Cited

U.S. PATENT DOCUMENTS

| | | | |
|---|---|---|---|
| 8,379,027 B2* | 2/2013 | Lim et al. | 345/467 |
| 2001/0051915 A1 | 12/2001 | Ueno | |
| 2002/0015064 A1* | 2/2002 | Robotham et al. | 345/863 |
| 2003/0026500 A1* | 2/2003 | Hersch et al. | 382/293 |
| 2005/0021504 A1* | 1/2005 | Atchison | 707/3 |
| 2005/0085257 A1* | 4/2005 | Laird et al. | 455/550.1 |
| 2005/0274804 A1* | 12/2005 | Matsumoto | 235/462.01 |
| 2007/0060203 A1* | 3/2007 | Callaghan et al. | 455/564 |
| 2007/0125861 A1 | 6/2007 | Shoobridge | |
| 2007/0138270 A1* | 6/2007 | Reblin | 235/383 |
| 2007/0158425 A1* | 7/2007 | Matsuura | 235/462.13 |
| 2007/0239848 A1* | 10/2007 | Avery | 709/217 |
| 2008/0278422 A1* | 11/2008 | Xu et al. | 345/83 |
| 2008/0317347 A1* | 12/2008 | Lim et al. | 382/182 |
| 2010/0260373 A1* | 10/2010 | Neven et al. | 382/100 |
| 2011/0000958 A1 | 1/2011 | Herzig | |
| 2011/0026081 A1* | 2/2011 | Hamada et al. | 358/1.18 |
| 2011/0082747 A1* | 4/2011 | Khan et al. | 705/14.58 |
| 2011/0115796 A1* | 5/2011 | Murrett et al. | 345/467 |
| 2012/0151293 A1* | 6/2012 | Beals | 714/755 |
| 2012/0311623 A1* | 12/2012 | Davis et al. | 725/18 |
| 2013/0032634 A1* | 2/2013 | McKirdy | 235/375 |

OTHER PUBLICATIONS

U.S. Appl. No. 13/200,849, filed Oct. 4, 2011, Boudville.
U.S. Appl. No. 13/136,232, filed Jul. 28, 2011, Boudville.
U.S. Appl. No. 13/068,782, filed May 16, 2011, Boudville.
U.S. Appl. No. 13/068,559, filed May 9, 2011, Boudville.

* cited by examiner

QR Code 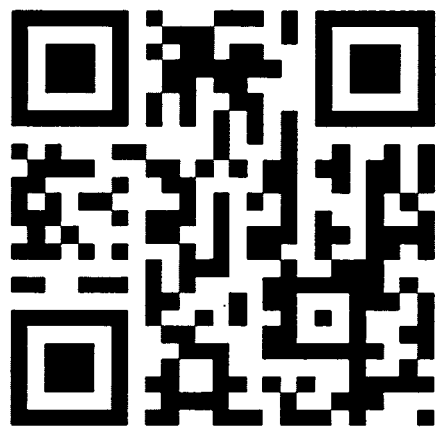
Data Matrix 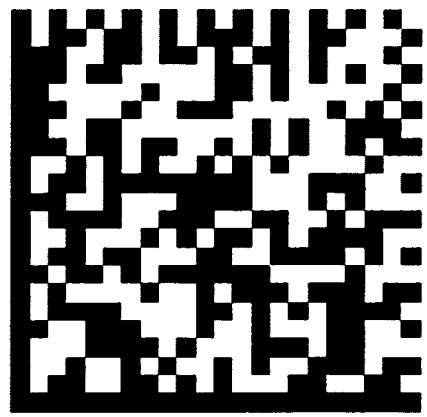
Figure 1

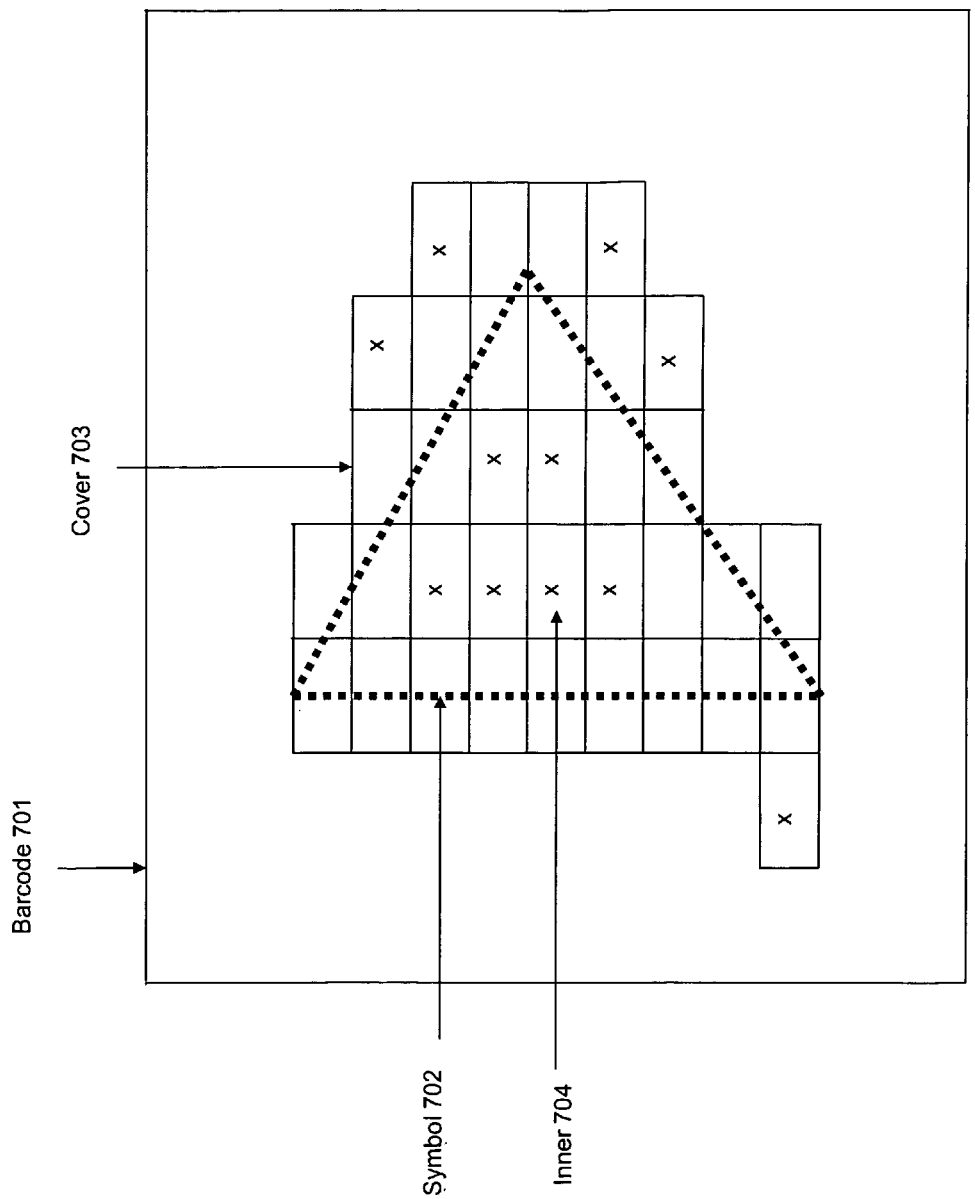

COLOUR BARCODES AND CELLPHONE

REFERENCES CITED

"Service-Oriented Architecture" by T. Erl, Prentice Hall (2004), 0131428985.
"Barcodes for Mobile Devices" by H. Kato et al, Cambridge (2010), 978-0521-888394.
"Error Control Coding" by S. Lin and D. Costello, Prentice Hall (2004), 0130426725.
"J2EE Web Service" by R. Monson-Haefel, Addison-Wesley (2003), 0321146182.
"Error Correction Coding" by T. Moon, Wiley (2005), 0471648000.
"Barcode design by evolutionary computation" by S. Ono et al, Artificial Life and Robotics, v. 13 (2008).
"The Bar Code Book" by R. Palmer, 5-th edition, Trafford (2007), 1425-133746.
"Two-dimensional color barcode and method of generating and decoding the same" by P. Cattrone, U.S. Pat. No. 7,478,746 (2009).
"System and method for decoding and analyzing barcodes using a mobile device" by O. Attia et al, U.S. Pat. No. 7,287,696 (Oct. 30, 2007).
"Apparatus and method for printing two-dimensional barcode and articles incorporating such barcode" by G. Athens et al, U.S. Pat. No. 6,631,012 (2003).
"Clock free two-dimensional barcode and method for printing and reading the same" by D. Lopresti et al, U.S. Pat. No. 6,115,508 (2000).
"Optically readable two dimensional code and method and apparatus using the same" by M. Hara et al, U.S. Pat. No. 5,726,435 (1998).
"Systems and methods for animating barcodes" by J. Herzig, US Patent application 20110000958 (Jul. 2, 2009).
"Three dimensional barcode" by R. Shoobridge, US Patent application 20070125861 (2007).
"Data transfer system using mobile terminal and two-dimensional barcode" by T. Ueno et al, US Patent application 20010051915 (2001).
"Barcode and cellphone for anonymity and privacy" by W. Boudville, U.S. patent application Ser. No. 13/200,849 (Oct. 4, 2011).
"Using dynamic barcodes to send data to a cellphone" by W. Boudville, U.S. patent application Ser. No. 13/136,232 (Jul. 28, 2011).
"Cellphone changing an electronic display that contains a barcode" by W. Boudville, U.S. patent application Ser. No. 13/068,782 (May 16, 2011).
"Multiple uses of an e-book reader" by W. Boudville, U.S. patent application Ser. No. 13/068,559 (May 9, 2011).
[Web references are from December 2011.]
bit.ly
wikipedia.org/wiki/Barcode
wikipedia.org/wiki/Data_Matrix
wikipedia.org/wiki/E-book
wikipedia.org/wiki/Mobile_tagging
wikipedia.org/wiki/Qr_code

TECHNICAL FIELD

The invention relates to the use of a cellphone to read an electronic display that is showing a barcode.

BACKGROUND

One and two dimensional (2d) barcodes are now in common use. The 2d barcode in particular has seen popular deployment in signs posted at various locations. Typically, the 2d barcode encodes a URL. A common usage is for a user with a cellphone that has a camera to take a picture of the barcode. Software on the cellphone decodes this to the URL. If the cellphone has (wireless) Internet access, it then goes out on the Internet to that address and downloads the webpage and displays it on the cellphone in a browser. Whereby the user can interact with it as a standard webpage.

A barcode is preferred over the display of the URL in human readable text, because the latter needs the mobile user to read it and type it into her cellphone browser. The small size of the cellphone screen and the awkwardness of typing letters on the cellphone make the input of the URL error prone.

Hitherto, from the granted patents and patents pending, as well as general knowledge of the state of the art, such displays of 2d barcodes are usually in permanent form, like printed on a poster or piece of paper.

Several 2d barcodes use black and white barcodes. This includes the encoding schemes of QR codes and Data Matrix. The use of black and white is for maximum contrast, and hence to minimise error rates in the decoding process.

SUMMARY

A two dimensional barcode with default background and foreground colours uses other foreground colours. The latter becomes a separate means of encoding data, used by decoding hardware and software, or by an observer's perceptions. The new colours can show text or graphics present in the default encoding. Or the new data is separate from the latter. A barcode on a dynamic display can show a progress indicator for an operation started by a user who imaged the barcode with her phone. Or it can show the number of votes for users who picked it with their phones. The barcode could show scrolling text, without blocking the default barcode structure.

A specific choice of default barcode encoding associates different choices or users with specific graphical elements present in each barcode. Each element is shown in a non-default foreground colour.

A barcode rotates as a result of an operation made by a user who imaged it. This could be in addition to any non-default foreground colours present in it due to other user actions. The rotation can be a progress indicator or used in a game.

A barcode on a computer screen simulates a button, different from buttons in a standard GUI. Pressed when the user takes a photo of it with a cellphone. The barcode border changes its appearance in response.

A barcode on a public electronic display is a game environment. Players with cellphones are represented by symbols drawn in non-default foreground colours, moving inside the barcode.

A user with a cellphone and a linked e-book Reader interacts with an Automated Teller Machine's screen and camera. The Reader shows barcodes read by the ATM camera. The ATM screen shows barcodes read by the cellphone camera. Data travels in full duplex.

Suppose a barcode has a symbol drawn on its foreground rectangles, and the barcode encodes a URL. The URL is altered to maximise the number of foreground rectangles that the symbol intersects, helping a human interpolate the symbol from fragments.

BRIEF DESCRIPTION OF THE DRAWINGS

FIG. 1 shows examples of a QR Code and a Data Matrix Code.

FIG. 7 shows a barcode with a symbol and a covering set of rectangles.

DETAILED DESCRIPTION OF THE PREFERRED EMBODIMENT

Figure 2:
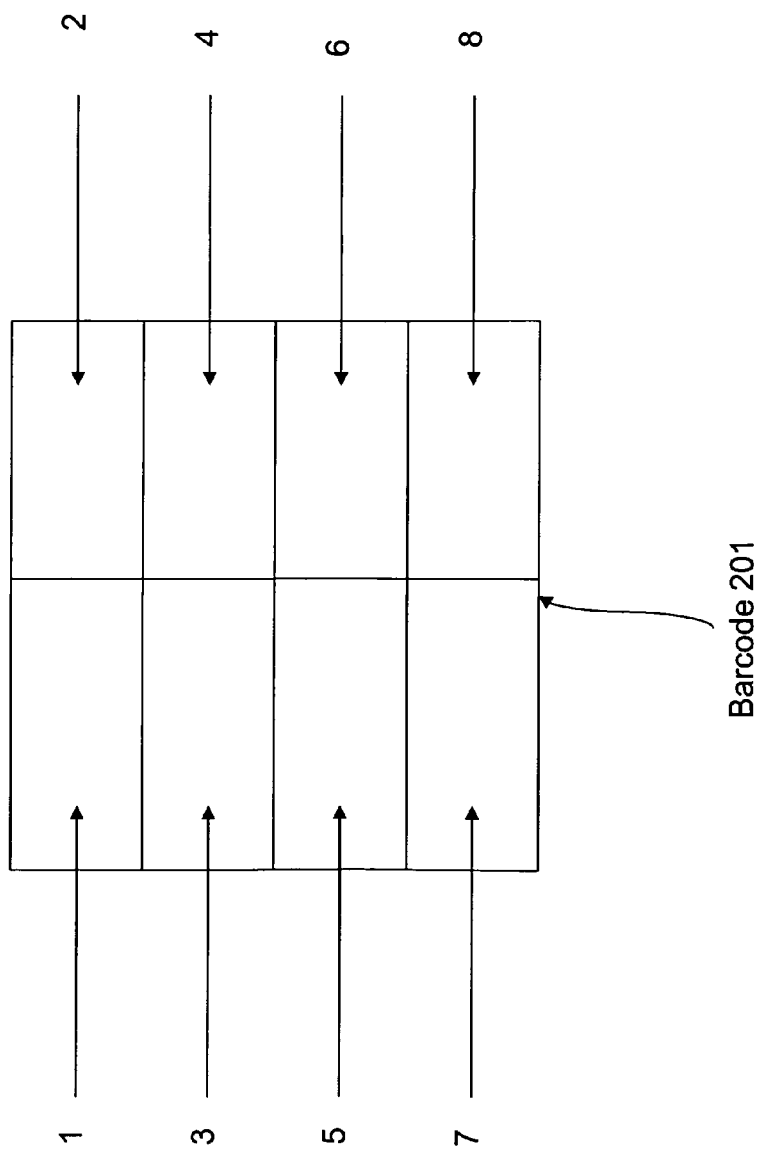
FIG. 2 shows the demarcation of a barcode into 8 segments, for using non-default foreground colours.

What we claim as new and desire to secure by Letters Patent is set forth in the following claims.

In 3 earlier Provisionals, we described extensions to barcode uses—"Barcode and cellphone for anonymity and privacy", U.S. patent application Ser. No. 13/200,849 ("849"); "Using dynamic barcodes to send data to a cellphone", U.S. patent application Ser. No. 13/136,232 ("232"); "Cellphone changing an electronic display that contains a barcode", U.S. patent application Ser. No. 13/068,782 ("782"). We will also use here "Multiple uses of an e-book reader", U.S. patent application Ser. No. 13/068,559 ("559").

We would first like to explicitly mention one aspect of "232". It uses the phrase "dynamic barcode" in its title and body. This differs from the meaning currently ascribed in the state of the art. The latter refers to a barcode depicted in an unchanging manner, like printed on a sheet of paper or poster. The "dynamic" in the latter is where the data in the static barcode is a URL pointing to a location on the Internet. The web server at that address maps it to another URL, and this mapping can change over time. Hence the use of "dynamic". It is more of a marketing slogan than literal reality. Occasionally in the state of the art, "dynamic barcode" refers to a barcode on a computer screen. But here also the barcode image does not change. Whereas our usage in "232" and in this invention is explicitly where the barcode appears on a computer screen and can change.

When we use the term "barcode" we will mean a 2 dimensional barcode, unless otherwise specified.

The invention deals primarily with the use of colour in 2d barcodes. Though it has aspects that do not necessitate the use of colour with those barcodes.

The invention has the following sections:
1. Basic Implementation;
2. Barcode on Dynamic Display;
2.1 Constant Basic Barcode;
2.2 Barcode Video;
3. Properties of Specific Encodings;
4. Rotating Barcode;
5. Error Detection and Correction;
6. Games;
7. Symmetry Breaking;
8. Cellphone, Reader and ATM;
9. Wireless and Cable Television;
10. Shaping a Barcode and URL;
11. Making a Barcode on a Public Display;
12. IP Address and HTML Form;
13. Other Extensions;

1. Basic Implementation

For QR codes, there has been discussion and implementation by others of colours different from black and white, motivated by artistic or aesthetic reasons. Typically, the author or artist wanted to make a QR code that she considered visually more appealing or distinctive, perhaps in part to be more artistically compatible with a larger image that the code might be appearing in or next to. These colour uses are for subjective impressions in the human mind (wetware).

This invention differs from the above, in describing colour extensions to black and white barcodes, where these encode information accessible or extractable to hardware and software on a user's devices, as well as to the user's objective perception. The user's devices most importantly include cellphones with cameras. But also other mobile devices like digital cameras, tablets and e-book readers. We shall refer to a cellphone as the preferred user device, on the understanding that other mobile devices are also possible.

In this invention when the use of colour in barcodes is for a user's perception, it will be primarily where the user gets objective informational data, as opposed to subjective, aesthetic impressions.

We define a "basic barcode" to be a standard black and white barcode.

Consider an existing barcode scheme that uses black and white rectangles. Without loss of generality, define the white rectangles to be the background, and the black rectangles to be the foreground. Now, instead of just the single black foreground colour, there are several non-default foreground colours. For the sake of illustration, we take there to be 10 such colours. The colours are chosen so that they are widely separated from each other and from the background colour and the default foreground colour. The separation could be in a RGB (red-green-blue) colour space. Or equivalently in an HSL (hue-saturation-luminosity) colour space. The separation maximises the ability of a cellphone to correctly resolve an area in one of those colours, as being that colour, as opposed to mistakenly picking one of the other foreground colours or the background colour.

Pick an existing black and white barcode method. FIG. 1 shows 2 types of barcodes, QR code and Data Matrix code. Others are possible.

Suppose data to be encoded is in 2 sets. The first is to be encoded as a default black and white barcode. The second is extra data.

Run the existing barcode construction method to produce the usual black and white barcode from the first set. This barcode is held as an intermediate result in computer memory.

To encode the second set, various colour steps are possible. One example is to make a division of the Barcode 201 in FIG. 2 into 8 segments, designated from 1 to 8, and approximately equal in area. The borders between neighbouring segments can be chosen to be also the positions of rows and columns in the existing black and white method. Thus any rectangle will be entirely enclosed in a segment. This restriction will be removed later.

For each segment, pick a non-default foreground colour. Different segments might have the same colour. When a black rectangle in the intermediate output is (entirely) enclosed by a segment, replace it by a rectangle in the colour for that segment. Hence the output barcode will be in a multicoloured format, where the number of colours is greater than 2.

The mapping from the second input data set to the segment colours is a deterministic invertible function. So knowing the colours of the segments, it is possible to find the second data set. The function is restricted to be invertible over all expected input values of the second data set. "Expected" means that there could be restrictions on the range on input values. These restrictions could exist, in part, to allow the existence of that invertible function.

The cellphone takes an image of the colour barcode and performs decoding. It is assumed capable of recording a colour image. The spatial (pixel) resolution of the cellphone camera is assumed to be high enough that the cellphone can read correctly the spatial distribution of the rectangles. While the colour resolution (the number of colour bits recorded at each pixel) of the camera is assumed to be high enough to resolve the different foreground colours.

Both assumptions involve the intrinsic capability of the cellphone. But also the distance to the display device, and the intensity of the light coming from it, and whether the device has an active display or a passive display (reflecting ambient light).

A conservative assumption is to use 8 bits each in RGB space, to define the colours used on the display. This means that most colour displays will be able to show the colours. Also, most standalone cameras and cameras in cellphones can store 8 bits in an RGB format.

From the recorded colour image on the cellphone, the cellphone finds for each segment the most common foreground colour. The ordered list of these colours has a maximum of 10**8 combinations. This is information that can be used entirely separately, or in conjunction with the 'regular' information in the default barcode.

The cellphone then performs the usual decoding of the image, assuming only black and white rectangles. For example, it can use intensity thresholding, so that a pixel with an intensity below a threshold is considered black, otherwise it is white. Hence this invention is backwardly compatible with an existing black and white barcode encoding scheme.

The choice of 8 segments in FIG. 2 is arbitrary. More or fewer segments could be picked. More means more information encoded. But it also increases the possibility of misidentifying the colour of a segment, because there are fewer data (foreground rectangles) in that segment.

The choice of 10 foreground colours is arbitrary. More might be chosen over time, as the imaging ability of typical cellphones improve.

The choice of the number of segments and the shapes of each segment could be fixed by some published standard. So the display device and cellphone can have pre-installed code that implements this. Or the cellphone could have software that detects the foreground colour in each segment, without necessarily knowing a priori the number and shape of the segments. This is a straightforward process of pattern recognition.

There currently exists software on some cellphones to decode a standard barcode, and where, when the decoded data is a URL, it automatically brings up a browser in the phone and points it at that URL. This can be extended in various ways to use the newly extracted colour information.

One use of the colour information is as a serial number. In the above example, the symbol space is of size 10**8, which might be large enough in some applications so that each barcode is made with its unique serial number embedded in its colours.

Another use concatenates the colour information with the regular information. Suppose the latter is a URL, and there is insufficient space in the black and white encoding to write it out fully. There could be a published mapping from the colour information to text [ascii] symbols, which are then appended to the URL. This is perhaps the simplest, most obvious use of the colour information.

The method of the previous paragraph could be made backwardly compatible with existing cellphones that only decode black and white barcodes. Then, the regular (black and white) information might be a complete functional URL, but which only goes a top level or generic page at a website. Whereas if the colour data can be found, it is appended to the URL to make a more precise or customised webpage.

The mapping from the colours to meanings or actions could be performed several ways. One is to have published hard coded mappings. These could be implemented by the cellphone, perhaps as a fallback if other methods are unavailable.

Another method is to have a web site or web service at some well known URL. Considered as a web service, it could take as input a query from the cellphone that has the colour or, more likely, the list of colours it found from a barcode. For each queried colour, it could map that to the closest colour in its database. This lets the web service clean up any noise in the query and transform it into a canonical (standardised) list of colours. It would then look up any data (result) corresponding to this list and relay that data or a null result to the asking cellphone.

There might be a series of such web services, as fail safes. Or perhaps the URL of the service could be conventionally encoded in the barcode.

More generally, a web service could define more varied regions than those in FIG. 2, from which colours would be extracted.

Consider "Systems and methods for animating barcodes" by J. Herzig, (US Patent application 20110000958). The use of colour in that invention is very different. It combines 3 separate barcodes, where each has the foreground colour (say) replaced by red exor green exor blue. A camera takes a photo of the amalgam and decomposes it into its RGB parts, and each is then decoded as a normal barcode.

Our invention as described above does not overlay 3 (or 2) barcodes. In Herzig, the placement of the red rectangles in the red barcode is independent of the placements of the blue rectangles in the blue barcode, and similarly for the green. Herzig has 3 independent spatial distributions. One difference with our invention is that our barcode only has one spatial distribution of rectangles. A second difference is that in ours if a given rectangle (or part thereof) is red, then it cannot be green or blue. So in a given spatial location, in Herzig the colours at that location are uncorrelated. If red is present there, this is independent of whether blue or green is also present. Whereas in ours the colours are anticorrelated. If red is present at a location on our barcode, blue and green cannot be.

2. Barcode on Dynamic Display

Figure 3:
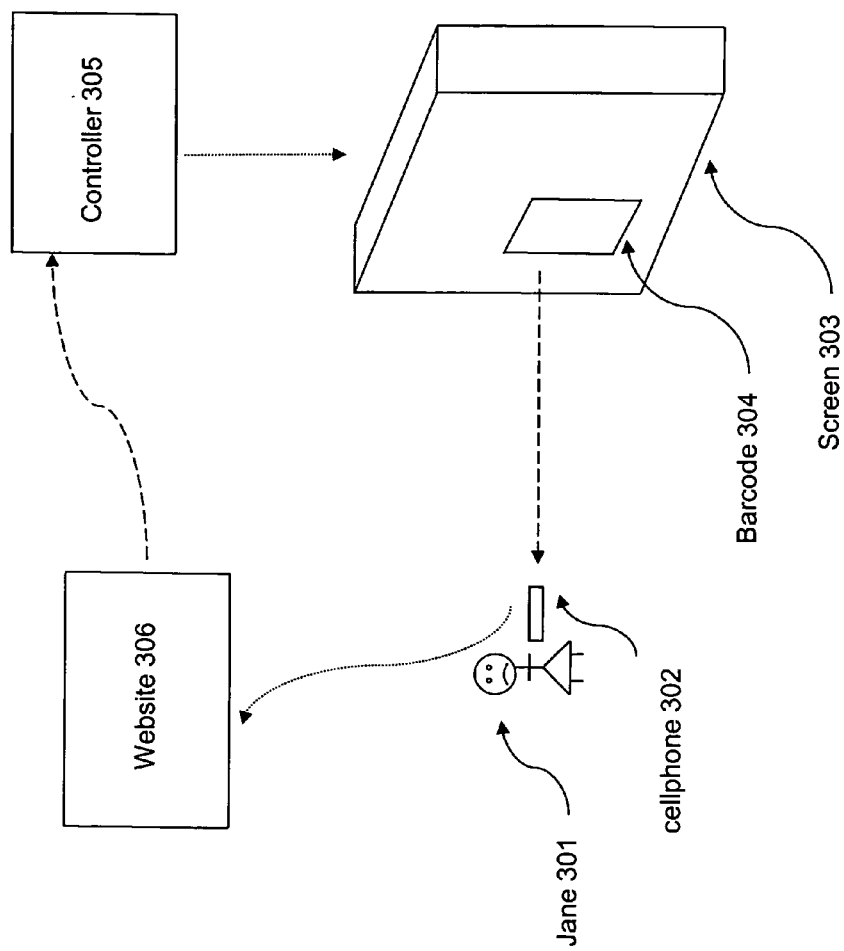
FIG. 3 shows Jane using her cellphone to read and change the screen display.

FIG. 3 of the current invention is essentially FIG. 1 of "782". In brief, FIG. 3 shows a user Jane 301 with a cellphone 302 that takes an image from display Screen 303 of the displayed Barcode 304. The barcode encodes an URL that points to Website 306. The encoding is the conventional black and white encoding. Website 306 is also the server that sends commands or images to Controller 305, which controls Screen 303. Hence Jane could via this feedback affect the subsequent images on Screen 303, as well as altering any future content that appears in Barcode 304. See "782" for a fuller description.

For clarity, FIG. 3 only shows one barcode on Screen 303, but there could be several.

The arrangement of FIG. 3 shifts Jane from a passive onlooker at a public display screen to a participant in whatever interactive session that now becomes possible. Also, FIG. 3 only shows one member of the public, Jane. In general, there could be several. "782" describes how the multiuser interactivity can act as a honeypot, where once one user is seen by other members of the public as near the screen and interacting with it, then it increases the likelihood that others start doing so.

Note that in FIG. 3, Screen 303 has no mouse, keyboard, keypad or trackball accessible to Jane. While Screen 303 and its Controller 305, considered together as a computer, might indeed have such devices, these are typically not physically available to a member of the public. They might be in a console or server room near Screen 303 accessible only to the system administrator. Also, in general, Jane cannot physically touch Screen 303, to reduce the chances of damage to the screen. Which rules out the use of a touch screen for user feedback.

While the URL in FIG. 3 typically uses http, it can also be https, ftp or ftps. For ftp and ftps, there would be an ftp server at the domain given in the URL. Instead of Website 306, there would be, say, "ftpServer 306". The ftp server at this address would take the URL and start downloading via ftp to Jane's phone. The name of the file being downloaded might have a dummy part that uniquely identifies Controller 305, for the general case where the ftp server controls several such controllers. Hence the ftp server can send a signal to the appropriate Controller 305, for it to change the appearance of Barcode 304, to indicate as feedback to Jane that the barcode was successfully picked.

Barcode 304 can also be shown in a button-style format. Consider first a mechanical (push)button. This typically is instantiated in one of two forms. The first is as a unary device. When the button is pushed, it reverts back to its previous position. The second is as a binary device. When the button is pushed, it goes to a second position. And when pushed in the latter position, it go to its first position, where these positions differ in displacement from the surface around the button. When graphic user interfaces became common in the 1980s, the mechanical button was re-instantiated as a graphical button. The latter was typically accessed (clicked) by the user using a mouse, keyboard, trackball or light pen or by touching the image of the button on the screen, if the screen had haptic ability.

But following our method of "782", we offer a different implementation of a graphical button. It does not use the previously mentioned peripheral devices or any haptic ability of the computer screen. Barcode 304 might be surrounded by a border that encloses the default background border. This outer border might be coloured so as to appear like a 3 dimensional object, just as standard graphical buttons are displayed. Hence the outer border of Barcode 304 might also simulate the shadowing caused by a light source. But here Jane "presses" the button that is Barcode 304 by the method of "782"—initiated by taking a photo with her cellphone, and this is typically done by pressing a 'photo' button on her cellphone.

When in response Website 306 sends instructions to change Screen 303, this might include changing the outer border and perhaps the standard border of Barcode 304, to indicate visually that the button of Barcode 304 was pressed. If Barcode 304 represents a binary button, then the outer border might have 2 appearances, corresponding to the 2 states. While if Barcode 304 represents a unary button, the outer border might have 1 appearance. In the unary case, there might be a brief change in the border appearance, to indicate that the button was pressed, and then Barcode 304 and its border appear in the original form, representing the default unary state.

In both unary and binary cases, the display of the barcode geometry itself might quickly and temporarily change, to indicate that it was successfully picked.

For a binary button/barcode, Website 306 can keep a record of its state. This record can include the network address of the entity that made the last query which caused the website to change the button's state. The website could have a policy that it will only accept another query to reset the button's state if it comes from the same address. Or it could let any entity make that second query which it acts on.

Website 306 might require that it gets the second query within some specified time, in order to reset the button/barcode. If the query is not gotten, then the website might have a policy of keeping the button at the second state for some other amount of time.

The button of Barcode 304 might also enclose text or graphics that are outside the barcode.

The novelty of our barcode button is that it differs substantially from software buttons in conventional GUIs, where the buttons in the latter are pressed by peripheral devices of the computer showing the button in its screen.

When Jane takes an image of the button of Barcode 304, and her phone then shows a webpage, the phone might also vibrate, as an additional simulation of a mechanical button. Note that when she took the photo, she likely already pressed a mechanical button on the phone. But the extra vibration can reinforce this metaphor.

The vibration could be done when the cellphone gets a response from Website 306. The response could have an instruction to do so. Where the instruction could include parameters of the vibration, like its duration and amplitude, to the extent that a cellphone lets these be specified. There is likely to be a temporal lag discernible to Jane between when she took the image and when Website 306's reply is decoded by the cellphone. Doing the vibration after the latter could serve to distinguish this case from when Jane just presses the camera button on her cellphone.

Instead of or addition to this vibration, the cellphone might also make a sound ("ringtone"), to simulate a clicking. The reply from Website 306 could include properties of the sound, including perhaps a full copy of the audio.

If the sound and vibration both happen, they might be implemented concurrently.

Also, if Screen 303 has an associated audio output capability, Website 306 might use this to play a sound emanating from Screen 303, like a button click. If Screen 303 is already playing an audio track, perhaps in conjunction with video on the screen, then the sound of the button click might be suppressed or overlaid onto the audio track.

The steps in Section 1 apply to a barcode printed onto permanent media or onto a dynamic display. Here in Section 2, we specialise to the latter case. In turn, there are several subcases.

2.1 Constant Basic Barcode

We define 'constant' to mean that the barcode might have colour segments, as in Section 1, but when these are converted to black, the barcode is a static pattern on the display, when viewed over time. It is also assumed that the location of the barcode on the display is fixed, and that the area of the display outside the barcode can vary over time. Roughly, think of a computer screen playing a video, where a constant valued barcode appears near the bottom.

The distinguishing feature of this section 2.1 is that now the barcode can have colour regions that change over time.

The use of colour has two cases. The first is primarily for decoding by the imaging device. The information in the colours is unlikely to be meaningful per se to the user. This amounts to having a "colour video", where the colour patterns vary over time, against a constant backdrop.

The other case is the writing of text or graphics onto the foreground rectangles, where this is primarily for human viewing and understanding. The text or graphics is drawn in a different foreground colour. Due to the scattered, often non contiguous nature of the foreground rectangles, any letters or digits or graphics will appear in fragmentary form. But the human eye and brain may be able to successfully interpolate and thus reconstruct a full symbol or glyph. This is aided if a sequence of letters or pictographs appear, that collectively have semantic meaning as a word or phrase. The brain can use this to further aid in interpolating and discerning individual symbols.

This differs from the state of the art, where occasionally there is description of how an author overwrites part of a barcode with an image. The part of the barcode under the image cannot be seen. In this invention, the barcode's rectangles remain visible.

We also optionally but preferably alter the default step in the previous section that made a foreground rectangle be entirely in one colour. Now the rectangle could have different parts in different foreground colours. Specifically, a foreground rectangle could have a part or parts in the default foreground colour, and other parts in non-default foreground colours. This makes it easier to draw recognisable letters or symbols.

The foreground colour of the letters should be chosen to give easy contrast to the default foreground colour and background colour.

Where does the text come from?

One choice of text to show is if the barcode encodes an URL, so the URL is shown as text in the barcode. But most URLs will be too long to fit as text overwriting a barcode.

Thus the next extension is for whatever textual data that is encoded by the barcode to be written and scrolled over time across the barcode in ticker tape style. The scrolling could be repeated. When the scrolling of the text reaches the end of the text, the scrolling begins again, at the start of the text. This is not restricted to an URL.

One utility is that such dynamic properties of the barcode are more eye catching to an observer, and hence possibly increase the chance that she will use her mobile device to scan the barcode.

One extension for text data is that the scrolling direction of the data over the barcode can be a function of the language of the text. For example, if the text is Arabic, the scrolling is from left to right (the text moves from left to right). European languages would scroll from right to left. Traditional Chinese might scroll from bottom to top. If the text is written in Unicode or Ascii, it is easy to programmatically check for these cases. For example, if text is in Ascii, this is the Roman alphabet, and any languages using it can be assumed to read from left to right, so the scrolling will be from right to left.

If text is detected in Arabic, then it is read from right to left, so it is scrolled from left to right. One possible complication is that if Arabic on a printed page has numbers, like "12345", this is read from left to right. For scrolling in this invention, for simplicity, any enclosed numbers in Arabic might not change the scrolling direction.

If text is in Chinese, there could be 2 choices. Traditional Chinese is read from top to bottom. But modern Chinese is often read from left to right. The latter uses a graphically simpler set of pictographs. A decision could be made in software that if traditional Chinese symbols are detected, to always scroll from bottom to top, to reinforce the traditional aspect of the text. While simplified Chinese scrolls from right to left.

Depending on the size of the barcode, scrolling in Chinese might be moot. Chinese pictographs are larger than alphabet symbols, because they encode words or phrases. A barcode might not be large enough to show more than one pictograph at a time. In this case, scrolling is not possible or advisable.

Another type of data that might be shown over the barcode could be also when the barcode encodes an URL. The computer displaying the barcode might reduce the URL down to the base domain, and find any symbol associated with it that is used in the browser address bar. Some websites have produced small symbols that are displayed in that bar, next to their URL, called favicons (favourite icons). These symbols are often coloured.

Any such symbol associated with the encoded URL could be shown overlaid onto the foreground rectangles. Here, any colours in the symbol might be transformed, so that they are sufficiently different from the default foreground and background colours.

Where a graphic image is shown in a barcode, it might be an animated graphic, like an animated GIF. The center of mass of the graphic might remain at a constant location in the barcode, but the image might cycle through a set of images.

This could be combined with the scrolling display of the URL.

Another option for an encoded URL is when the computer has access to the Internet and can get that webpage. It can extract the visible text and scroll this over the barcode in the manner given above. For simplicity or brevity, it might choose to only scroll some portion of the visible text, like perhaps the first paragraph. This is akin to how in newspaper articles, the first paragraphs summarise the rest of the article.

The access of the computer to the Internet need not be in real time. At some earlier time, the computer might have obtained that webpage. And at the time when the scrolling is done, the computer might not have any Internet access.

Another option is when the encoded data refers to some item for sale. Overlaid on the barcode might be the item's price, where this is found in the computer's database.

Another option is where the encoded data refers to some offer or event that is time sensitive. Periodically, the barcode might have text scrolling that says how much time is left for the user to scan the barcode; and then presumably perform some other actions with the decoded data.

In some of the above cases, it might be asked—could the overlaid text simply be written on the display next to the barcode? This might not be possible if the rest of the display is allocated to showing other images, and it is not considered desirable to overlay text on that. Even if it is possible, the methods of this section offer a compact alternative display modality. Just for novelty it might be useful, in order to catch the user's attention.

An extension is where some portion of the data is displayed outside the barcode, while other portions are displayed or scrolled over the barcode. For example, if the barcode encodes a URL, the URL or its base domain might be shown outside the barcode, while, say, the first paragraph of the associated webpage is scrolled in the barcode.

Another usage is for a barcode to have its entire foreground area, or a subset of it, change in intensity over time, while still keeping enough of a distance in the colour space from the background colour. This change might rise and fall in intensity, like a strobe effect.

If a display has a row of barcodes, then text (or symbols) that describes the group might be scrolled across all of these.

For example, the letter "a" might appear on the right most barcode, then it moves to the left, across the barcode, then off the barcode, and then appears on the neighbouring barcode to the left, etc.

Suppose there is a row of barcodes, where each refers to a choice of language of the printed text or audio that plays in the rest of the screen. The symbol in each barcode might be the flag of a nation associated with that language. For example, a Union Jack would appear on the barcode for someone who wants to pick English. Given the space constraints of the barcode size, and the restrictions on possible good choices of foreground colours, there would have to be some simplifications in the flag depictions. But good choices should be possible for several languages, so that the flag representations are clearly discernible.

The discussion of the previous paragraph clearly holds when the buttons are for picking countries, rather than languages.

Another example is where the row of barcodes let Jane pick the currency in which prices are shown in the rest of the screen. Each barcode could have a currency symbol or symbols. For example, the euro symbol, the yen symbol, the RMB symbol.

In the above cases where text is shown in or near the barcode, the text might first be sent to a filter that tests for the presence of 'sensitive' words or phrases. These might be profanity or hate speech, for example. If such are detected, then the phrases might be removed from whatever text is shown in the barcode. Or no text might be shown. In either case, another step might be to highlight the barcode or its border in some manner, to indicate that there could be offensive material. Or the barcode itself might not be shown, or be shown in some manner that makes the decoding invalid, in order to prevent downloading of prohibited material. The latter could be done by only showing a subset of the barcode, insufficient to allow a successful decoding.

If there are glyphs or small images associated with the barcode's contents, these might also be run through an image filter that tries to detect offensive images. If any are found, then the steps in the previous paragraph could be taken.

If text is shown in or near a barcode, machine translation (MT) might first be used on it. This could be done if the main language in use around the display's location differs from the language of the text. Any MT does not have to be done immediately prior to display. It could be done earlier and the results stored for later display.

Suppose there are 2 texts thus produced. One is the original, the other is the translation. These could be concatenated into one text that is scrolled in the barcode. Or the original is shown outside the barcode and the translation scrolls in the barcode.

The above assumed one translated language. There might be several languages in use around the display's location. So there might be several translated texts, that are then displayed in or near the barcode.

This section describes time varying overlays on the barcode that are perceived by the human mind. These differ in 2 ways from the state of the art. First, our overlays vary in time, whereas the latter deals with fully time invariant barcodes. Second, the displayed barcode here is mostly about text for reading, as contrasted to artistically altered barcodes.

In Provisional "782", we described a similar arrangement: an electronic screen is playing different types of news, like sports, weather and business. At the bottom of the screen are barcodes. Each wraps an URL that goes back to a web server that also controls the screen. Each barcode corresponds to one type of news. When the user Jane takes a picture of a barcode, her phone browser hits the web server, and the latter registers that hit as a vote to show that type of news, when the current news clip has ended. Hence the barcodes function as control buttons, to change the "channel".

From the above discussion, one possibility is that a symbol could be written into the foreground of each barcode. For example, for business, the symbol "$" might be shown, or whatever is the appropriate monetary symbol in the user's country. While for sports, a symbol like a soccer ball might be shown.

Provisional "782" described how different users at the screen might vote for the next type of news, by taking photos of the appropriate barcode. Now the votes could be shown, not as explicit numbers next to the barcodes, but as colour fills of the foregrounds of the barcodes. A foreground colour is picked, different from the default.

This new coloured region is shown, perhaps starting from the bottom of the barcode. The area of the new coloured region is proportional to the votes received for that barcode and type of news. The foreground colour for the vote fills might be the same across the barcodes. Or it might be chosen differently, where now the colour might convey some other type of information.

The purpose is to explicitly let viewers compare the popularities of the different choices represented by the barcodes. Hence, there is an implicit limit of the maximum number of votes shown per barcode. Imagine this is 10. Then when the foreground of the barcode is half coloured in this new foreground colour, it means that the barcode has gotten 5 votes.

When the first barcode to reach the limit happens, then 2 cases are possible. One is to keep the limit, and thus the display plateaus. So any barcode getting more than 10 votes will not have its display change (from showing all foreground in the new colour).

The other case is autoscaling. When the first barcode to reach the limit happens, a new vote limit is imposed across all barcodes. For example, the maximum might be doubled to 20. This has the effect of shrinking all the barcodes' new coloured areas in half.

As discussed above, by removing an explicit listing of votes by each barcode, it reduces the visual clutter on the screen.

Another method relates to the case when a barcode button is photographed by Jane with her cellphone, and this triggers some set of steps or process that might take some time on the display computer. The barcode can perform the extra visual role of a progress bar or indicator. If the maximum number of steps is known, then this might be the maximum value, and when each step is done, the barcode's foreground area in the new foreground colour rises appropriately. Or this new foreground area might move incrementally to the right along the barcode, like a traditional progress bar. Likewise if the maximum time to be taken is known or can be estimated, then this might be the maximum value used to define the barcode shading.

Another related use of an indicator level can be when a barcode has to be picked within a certain time interval. As this interval decreases, there could be a level indicator in the barcode's foreground that falls towards the bottom of the barcode. This intuitively tells the user of the time limit.

Above, we discussed two cases—where a barcode could show a symbol and where it shows a representation of the votes it has gotten. These could be combined, where there would now be at least 2 non-default foreground colours used. One is for the symbol, the other for the votes. When a pixel is turned on for both the symbol and the votes, its colour would be the symbol's colour, so that the symbol overlays the voting area and remains visible. Or, the barcode could alternate between showing first the number of votes and then the symbol.

2.2 Barcode Video

This extends our earlier invention "232" that described the playing of dynamic barcodes on a screen controlled by a computer. A sequence of basic (black and white) barcodes is played, typically at the same location on the screen.

There are several new possibilities. One is that as each barcode is shown on the screen, for long enough so that the user can record it on her cellphone, a subset of the barcode's data is shown as different coloured foreground rectangles, as per the discussion of Section 2.1. This assumes that the data subset is displayable. Typically this might be if the data is text. This displaying is useful in giving the user an extra visual indicator about what she is recording. And the changing of this as new barcodes are shown helps reinforce the impression.

Whether the displayed data is scrolled across its barcode might depend on how long the barcode appears. A decision might be made to only scroll if the barcode appears for some minimum time.

Instead of displaying part of the data in a barcode, the display might be of text or images that are not in the barcode. Given that the barcode is part of a sequence, there might be associated information about the sequence that the display computer has access to. Hence it could show this, possibly with scrolling. A difference between this scrolling and the scrolling of the previous section is that now the underlying foreground pattern (and hence also the background pattern, which is the complement) can change during the scrolling, if the latter occurs across the display of 2 or more barcodes.

A related possibility is to display on the barcodes text that was encoded on one of the barcodes. Imagine that the first barcode contains some explanatory text describing the contents of the sequence. It might be meaningful to scroll this as the sequence is displayed, and perhaps keep re-scrolling it so long as the sequence is running.

If the display computer has access to all of the sequence of barcodes, before the sequence is shown, then the text to be shown might come from any of the barcodes, and not necessarily the first. This can be considered an acausal operation.

Note that the assumption of the previous paragraph is not necessarily always true. The computer might be showing barcodes of real time data collected by the computer, where the contents of the last barcode might not be known when the display of the first barcode happens.

A decision might be made to not show text or graphics on a barcode or set of video barcodes, if the resolution is too coarse tog adequately and usefully support the partial display of that text or graphics. Note that this limit is for the case where the colour alterations are for human perception. The use of colour for computational decoding on the cellphone might still be done.

3. Properties of Specific Encodings

Hitherto, this invention treated the default foreground as a structureless canvas, on which were written various patterns and data in non-default foreground colours. Here, we describe how to use specific graphic properties of QR and Data Matrix codes.

Consider the example of the Data Matrix code in FIG. 1. Note the characteristic 3 locator posts. These are used by decoding software to orient the image.

One method of this invention uses each post as a digit display in positional notation. For example, consider where we have 10 non-default foreground colours. Each colour might map to a digit from 0 to 9. The lower left post could be the units column of a base 10 number. The upper right post is the tens column, and the upper left post is the hundreds column. Thus a number from 0 to 999 can be shown.

If the display medium can show time varying images, then the barcode might have a constant basic encoding of a black and white pattern, while over time the posts change colour to indicate some ongoing process. This is an alternative to the colour filling ideas for implementing a progress indicator discussed earlier. There, the filled foreground was just done in a single non-default foreground colour.

An extension is to use the area outside the posts, or a subset of it, to show another colour representing a digit.

A similar approach can be implemented with the Data Matrix encoding. Note in FIG. 1 that this has a characteristic black border on the left and bottom of the image. These could be used to show the units and tens columns of a 2 digit number. Likewise, the area outside these borders, of a subset of it, could be used to show another colour representing another digit.

Returning to the QR code, another approach can be used when several users are interacting at a common screen. Let the users be Jane, Dinesh and Rajiv. This invokes the configuration of FIG. 3 and the ideas of "782". Referring to FIG. 3, suppose there are now these 3 users, each with the requisite cellphone. They are competing in some game, displayed in Screen 303.

Instead of Screen 303 having 3 barcodes, one for each of the users to image, there is now just a single Barcode 304. Each user images this and then sees a webpage on her cellphone. The webpages on each cellphone might be the same, or they might be customised for each user. Screen 303 shows the common display of the game, possibly so that an audience can view it. Since the cellphones are too small to allow for a large audience.

The users focus on their own cellphones, when playing the game. This lets each user use the graphics functionality of her phone. Just as importantly, they do not have to keep taking photos of a barcode on Screen 303, in order to provide feedback to the game server at Website 306.

Barcode 304 can show some types of status data about each player. For example, Jane could be assigned the upper left post. Dinesh gets the upper right post and Rajiv gets the lower left post. Each post could be used as a simple counter, if the game is one where the players accumulate scores. If there are n non-default foreground colours, then each post can depict a range of n values for its player.

An elaboration uses the property that each post has an outer square and an inner square. The inner square might be used as the units digit and the outer square as the tens digit of the player's score.

An alternative is where the inner square shows the score, while the outer square shows some other property or status about the player. It might be a 'health' or 'wealth' or 'strength' indicator, where the colours that this can show depict how 'healthy' (how much 'food') or how much 'gold' or how experienced the player is ('hit points'). The colours used in the outer square might be the same as those for the inner square, though their meanings differ. Or the colours of the squares might be chosen to be non-overlapping.

For the Data Matrix code, the left and lower black areas could be used in a similar way to show the scores of 2 players, or some other properties.

Another method could be used in turn based games. The player whose turn it currently is might have her post or region fluctuate in intensity, while the regions of the other players remain constant.

The methods of this section are broadly applicable to any black and white barcoding scheme that uses asymmetries in its graphics so that decoders can correctly orient the barcode. In general, the asymmetries can be exploited by using non-default foreground colours at these locations, as well as in the barcode outside those locations.

4. Rotating Barcode

Since a barcode likely has asymmetries for orientation and aiding automated recognition by an imager, these can be exploited in extending the graphical user interface.

At the simplest level, the foreground colour remains the default value. But on the screen showing the barcode, it can rotate in steps of 90 degrees at a time. This could be used in a game (single or multiplayer), where a player has to perform some tasks. As a task is done, or perhaps when the player has made progress to an end goal, the barcode is rotated, while optionally but preferably keeping the center of mass of the barcode constant. The rotation is a visible sign of the player's state, to an audience around the screen, even if the player is playing the game on her cellphone. As in the previous sections, it is imagined that the barcode was initially imaged by her to start the game on her phone's browser.

If there are several players, each might have an associated barcode on the screen, while each focuses on her own cellphone.

The return of a rotated barcode to its original orientation might be a sign that the player has completed a game. Or that she has just completed a certain number of steps.

If the game involves Jane causing several complete rotations of her barcode, then each completed rotation might be shown on the main screen as a number by the barcode. Or in keeping with the main theme of this invention, the number might be written in a non-default foreground colour over the barcode. Or, each complete rotation maps to a given non-default foreground colour. So when the first 360 degree rotation happens, some subset of the foreground rectangles (maybe all of them) get shown in the colour corresponding to 'one rotation'. If Jane completes a second 360 degree rotation, the barcode's foreground gets painted in the colour corresponding to 'two rotations', and so on.

An alternative is when 2 competing players (or teams) use or affect the same barcode on the main display. Each player tries to rotate the barcode in the opposite direction to that associated with the other player. So when Jane scores a task ahead of the other player Dinesh, the barcode rotates by 90 degrees in Jane's rotational direction. The barcode might display the net number of full 360 degree rotations it has gone through.

Consider Herzig "958", which refers to a barcode rotation on an electronic screen. One difference is that Herzig does this in part to help the imaging device decide if it has already scanned the barcode. This is not a consideration in our invention. A second difference is that in Herzig, the rotation is not caused entirely or in part by the action of the user with the imager (cellphone). Whereas we refer to our users playing games, say, as a usage context for causing the rotation. More generally, in Herzig, there is no feedback between the user and the machine showing the barcode and its rotations.

5. Error Detection and Correction

Suppose a time varying pattern of colour is played on a constant basic barcode, or on a time varying set of basic barcodes, where the colour information is meant to be decoded by the user's device. Error detection or error correction could be implemented for the colour information. Akin to how the basic barcode might be in an encoding (like QR) that has spatial error correction. The lower information capacity of colour within a single barcode means that it is unlikely or infeasible that colour error detection or correction might be implemented in that single barcode. But a temporal sequence of colour information could possess enough capacity.

Given the dynamic nature of this interaction, along the lines of FIG. 3, it is possible that choices may be allowed, triggered by manual action by Jane or automatically by her cellphone 302 in tandem with Website 306. Assume that mechanisms exist for both detection and correction. Jane's manual actions could have been implemented at an earlier time as preset defaults for the choices below.

At the highest level, a choice is whether to use any detection or correction.

Suppose the decision was made to use detection or correction. The next decision is which to use. Error correction reduces the effective colour bandwidth compared to detection, and requires more computation on cellphone 302. If the transmitting data is not prerecorded (cached) then more computation would also be needed on the transmitter—Controller 305 or Website 306. The extra cost of correction might be acceptable compared to having to discard and possibly replay transmissions that have been detected with errors but which cannot be corrected.

Given a choice between detection or correction, the next decision might be what amount of either to implement. This assumes that the mechanisms have an adjustable parameter.

The above decisions might be made and altered over time. Suppose Jane starts recording a barcode video with colour information, that initially has no detection or correction. If her cellphone tries to decode the colour and fails, it can send a signal to Website 306 to initiate detection or correction. For each, there might be a choice of methods that the cellphone can decode, and if so, the cellphone might pick a specific method.

The methods would be publicly known, and the signal could pass a parameter indicating the choice. An extension is where the cellphone would transmit the method itself, written in some computer language usable by either Website 306 or Controller 305.

The signal might include a choice of the amount of detection or correction, if this is allowed.

Suppose the transmission from Barcode 304 has detection implemented. If errors are found, then the cellphone might send a signal to Website 306 to retransmit the frames. It might also ask for a higher level of detection, or to use correction. Likewise, if the transmission is using correction and errors are found that cannot be recovered, then the cellphone might ask for retransmission and optionally a higher level of correction, if possible.

Now suppose that the cellphone is receiving a steady stream of colour data and is decoding these, either with no errors or, if error correction is used, with an error level that can be overcome. The cellphone might signal Website 306 to reduce the amount of correction or detection, or to turn it off entirely.

The above looked at the use of error correction and detection for the colour data. It is also possible to consider reducing or eliminating error correction (or detection) in the default black and white encoding. If the standard decoding of these frames by the cellphone detects no or minimal errors, then the cellphone might ask Website 306 to reduce these. This could be done via an official extension of the encoding standard that turns off or reduces correction. Or by an informal (unofficial) extension that is publicly known and implemented by the cellphone and website. Because this is used in transient barcode videos, it would not affect the standard static instantiations of the barcodes (like on paper or posters) and thus is backwardly compatible.

The main benefit of reducing or removing error correction (or detection) is in the cellphone. It reduces the computational effort in decoding, and hence reduces energy consumption. There is a concomitant reduction in computing the encoding by the website's display, but since the latter has access to power lines, this is not as significant.

Another benefit could be to increase the bandwidth. Turning off entirely error correction might free up space on the barcode, which can then be filled with extra data.

6. Barcode Games

Earlier we described how colour could be shown in a barcode, to encode information about a game, single or multiplayer, happening elsewhere on the screen. Here we describe how the barcode itself could be used as the game environment.

Consider the barcode examples in FIG. 1. Suppose player Jane is represented by some unique symbol, in non-default foreground colours. She and the other players can move on the foreground areas. Depending on the rules of a particular game, a player may be able to jump across a maximum distance of background.

A game like Fox and Hounds could be devised. One player is the fox, the others are the hounds. The intent is for the fox to evade the hounds. Perhaps for a fixed number of turns, or perhaps to make it from one end of the barcode to the other. A human could play this solitaire, by being the fox, with computer players for the hounds. Or several humans could be the hounds. Perhaps also with several computer hounds.

Other games could have several humans on both sides.

One type of game might have some foreground rectangles marked in a non-default foreground colour as perhaps containing treasure or food or some other desirable item that a player might access when she reaches that rectangle.

The game might be shown on a barcode that takes up a large portion of the available screen area, for maximum visibility to an audience. Possibly, the barcode might through its conventional encoding have a large amount of information. This acts to maximise the intricacy of the foreground and background patterns and thus the difficulty of the game.

The human players might play the game on their cellphones or other portable devices with screens and the ability to interact with the game. The cellphone screen could show a webpage of the game, from a game server that also sends images of the game to the large public screen.

In solitaire mode, there might not even be any computer opponents. An example is to treat the barcode as a type of maze. Jane has to get from one end to the other, if possible. Note that under some instances of barcode and some rules of movement, this might not be possible for Jane in some starting locations. The (game) server might run algorithms to determine which barcodes are playable in this sense.

A multiplayer game might be strictly turn based, or it could let the players move as quickly as they can enter the moves on their cellphones.

A game might use the specific constant graphic structures of the encoding. For example, if QR codes are used, then one or more of the 3 locator posts in FIG. 1 could be used. Perhaps as starting points for players, or as destinations that a player tries to reach. While for the Data Matrix code in FIG. 1, the horizontal and vertical borders might be used in similar ways.

Just as some computer games have increasing levels of difficulty, one way this could be implemented here is by starting with a barcode that encodes a small amount of information and thus has a simple graphic structure. If a player gains enough experience with barcodes encoding a certain range of data, then the next level would use barcodes encoding more data. Hence there is a natural ordering arising from the underlying encoding.

The above treated a given barcode as constant during the game. Instead, a game might involve players being able to change the default setting of a rectangle from foreground to background or vice versa. For some encodings that use error correction, this might cause concomitant changes in other rectangles. A player might change a rectangle to perhaps uncover treasure. Or to make a path accessible to itself or inaccessible to others.

Another approach is to use the barcode as the floor plan of an area. The area could be rendered as being in 3 dimensions, akin to 'twitch' shooter games like Doom™. The barcode might be depicted showing the player's location and perhaps those of other players. Here we have a mapping: data ←→barcode→3d. The foreground rectangles of the barcode might be passage ways, and there could be means for the player to go from one passage way to another. Software could autogenerate the 3d surroundings from a barcode.

Thus far, the suggested games have not used the full potential of the barcodes. They have only used the geometry within a barcode. But the barcode encodes data. By also using the encoded data as part of the game, a novel multimodal game interaction becomes possible.

For example, suppose a barcode encodes or could encode a number. The number could be the amount of a prize. Imagine a game that starts with a partial barcode and player Jane working on that barcode. She manipulates the rectangles in the barcode. Perhaps to convert a foreground rectangle to background or vice versa. The binary nature of these actions means that a GUI implementation can simply let Jane click on a rectangle to change its state. A very intuitive action.

If the barcode method has some type of error detection or correction that ties together different sections of the barcode, then when Jane makes an attempted change, there could be software that then makes any related changes elsewhere on the barcode.

Jane might be presented with questions in a separate part of the game screen, that if she successfully answers, lets her do several changes to her barcode. She wants to alter it to encode as large a prize amount as possible, within some limits.

Because the mapping of data to and from its encoding in a barcode is meant to be done by machine, there could be helper software ('wizard') that suggests to Jane what changes to make. The game might be played against a time limit ('clock'). Or there are several players, each with her own barcode, competing to see who can first make a finished barcode. Or an unfinished barcode might have a team of players cooperatively working on it.

Now suppose the barcode encodes or could encode an URL. There could be a finite set of valid URLs. Each points to a possible prize. The webpage at each URL might include an image and text description of that prize. The URLs might all have the same base domain. As earlier, perhaps the game starts with an incomplete barcode. Or the game starts with a barcode that encodes a starting URL. The webpage at the latter could be shown elsewhere on the player's screen. It could describe the pages at the various final URLs, without explicitly giving full information about the URLs.

Jane's task is to transform the starting barcode to a barcode that encodes a valid final URL. If there are several of these, then she might be able to pick amongst them, perhaps on the basis of best perceived value to her.

She plays on a machine where changes to the barcode trigger a query to the new URL. Here, portions of the barcode that refer to the base domain might be impervious to change, and possibly drawn in different colours to indicate such a status.

On the Internet at the base domain is a web server that accepts URL queries. The server has a list of the starting and final URLs. Each might be held as a static webpage. When the server gets a query, it checks the URL against that list. If the URL is not on the list, then it returns a page to this effect. This can be more elaborate than standard error pages. The server could be adapted from a standard web server that serves dynamic and static pages.

When Jane makes a change to the barcode, it implies a new URL. The distances between this URL and the final URLs could be defined according to some metric. The latter could be a modification of the Hamming distance between two equal length bit sequences. In this situation, the URL and the final URLs need not be the same length. The exact functional form of the metric would depend on the details of the game.

One special case is where any changes Jane makes to her barcode are restricted to a constant length URL. Where the starting and final URLs are also of this length. Then the standard Hamming distance can be used as the metric.

The web server can find the distances. But telling Jane the distances is of little use to her. However the web server also knows the geometric layouts of the barcodes of the final URLs and the current barcode on Jane's screen. Suppose Jane is represented in the game by a location in the barcode. The server can return hints to Jane. In the form of directions that she can move, and possibly distances along each direction, and possibly a number indicating the 'value' of going in each direction. The value might be the name or value of the corresponding final URL. The hints to Jane could be deliberately incomplete.

The degree of difficulty of the game could be tuned in part by the amount and types of information given in the hints.

Also, the information in the hints could be adjusted depending on how close Jane's barcode is to a final barcode.

If Jane has tokens ('money'), she might be able to spend these at various turns, to get more hints, or more information in the hints.

The game user interface can be implemented as a specialised web browser. Suppose every change to a barcode rectangle causes a query. This corresponds to a standard browser making a query when the user clicks on a hyperlink. Or suppose Jane can make several changes, perhaps at non-contiguous locations, without causing queries. Then she explicitly does an action in the user interface that causes a query to the web server. Analogous to a user typing a new address into the address bar of a normal browser and pressing return.

If a barcode encodes an URL, the URL could be of another barcode. That is, the URL goes to a page that shows a new barcode and possibly other data. This enables games where the player does tasks on a given level or floor. If successful, she goes to the next level. This could be implemented both for the case where she can change some of the geometry of the current barcode, or where the barcode is fixed. For the former, instead of the objective being a prize as discussed earlier, it would be the assembling of a "door" to another level. For the latter, software on the server might not serve up the new barcode until she has done certain tasks associated with the current level.

The above describes key aspects of a general set of barcode games. The mapping between barcodes and URLs. The definition of objectives in terms of final URLs. The use of a web server to analyse user's changes to a barcode. The use of a metric by the server to measure how far a barcode is from the final barcodes. The subsequent use of the distances to generate hints from the server to the user.

7. Symmetry Breaking

Figure 4:
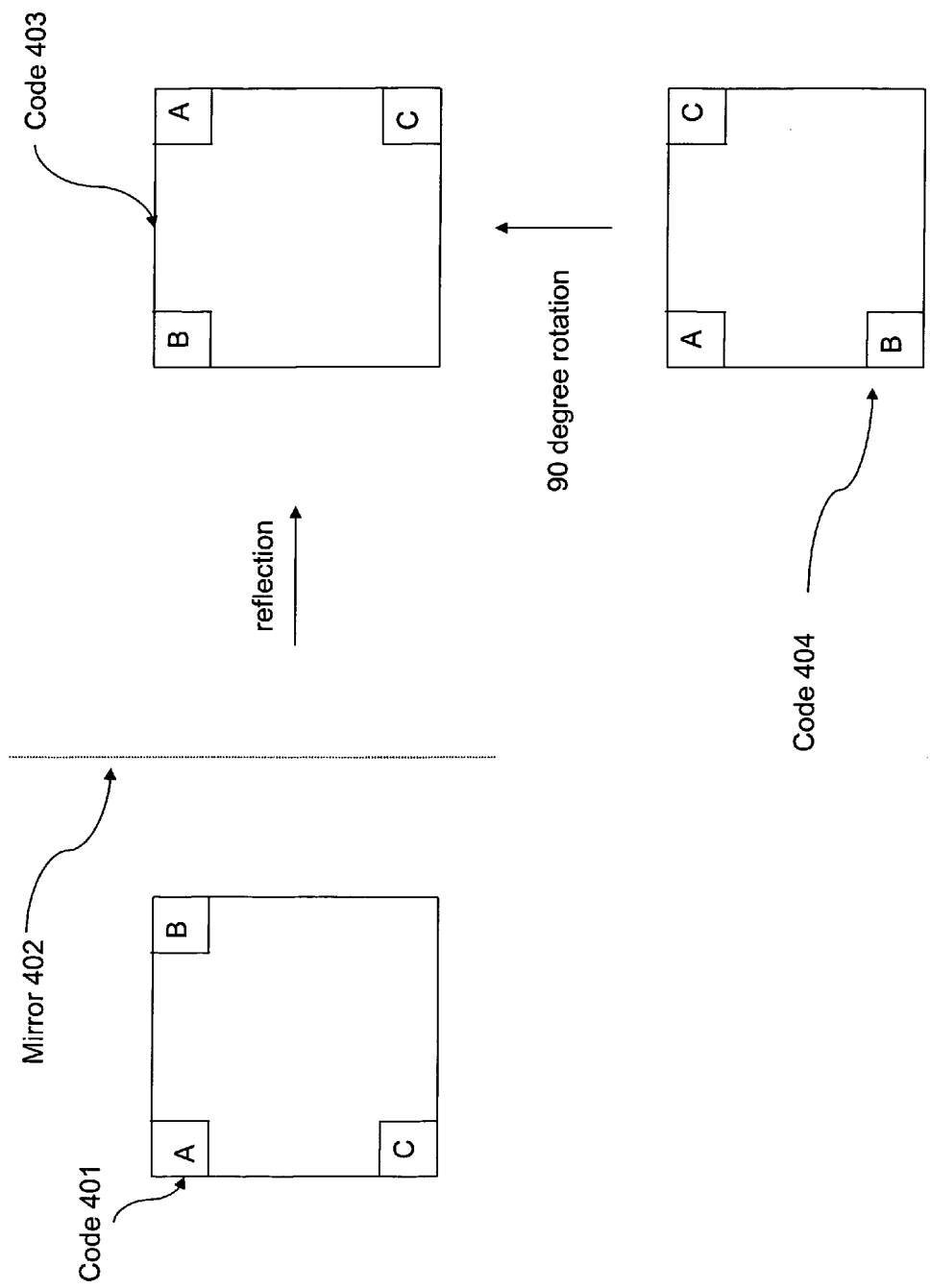
FIG. 4 shows the effect of reflection or rotation on QR Codes.

FIG. 4 shows a situation common to QR codes. Imagine we start with Code 401. The corner posts (locator marks) are illustrated as A, B and C for clarity, essentially to distinguish between B and C. There is a reflection using Mirror 402. We get Code 403. Now suppose we start with Code 404 and we do a 90 degree clockwise rotation about the center of mass. We also get Code 403.

Suppose Jane takes an image of Code 403 and her phone tries to decode it. What is the starting orientation? If no reflections are allowed, then Code 404 is the only answer. If reflections are allowed, then the decoding cannot distinguish between Codes 401 and 404.

It appears that the QR code definitions do not account for reflection. But reflection can occur in at least 2 contexts. The first is where there is a reflection of a QR code in a mirror or flat shiny surface, and Jane takes a photo and wants her phone to decode it. The second would be the use of a display surface like a window, where a QR code was printed on it. Perhaps for a department store, for window shoppers outside the store to take an image of it. But Jane might be inside the store and takes an image of the back of the image, where this is assumed to be just as visible as the front image. While the second case currently is for a permanent image, it can include future transparent dynamic displays if these become possible and common.

Note that at a fundamental physical level, macroscopic physical phenomena, like the images taken by Jane, are reflection invariant. (We leave aside subatomic physics.) In general, there is no intrinsic way when looking at an arbitrary image, to deduce that it is a mirror image. Special cases could arise if the image has text, and the text is reflected. But this cannot be assumed to occur with every image of a QR code.

Figure 5:
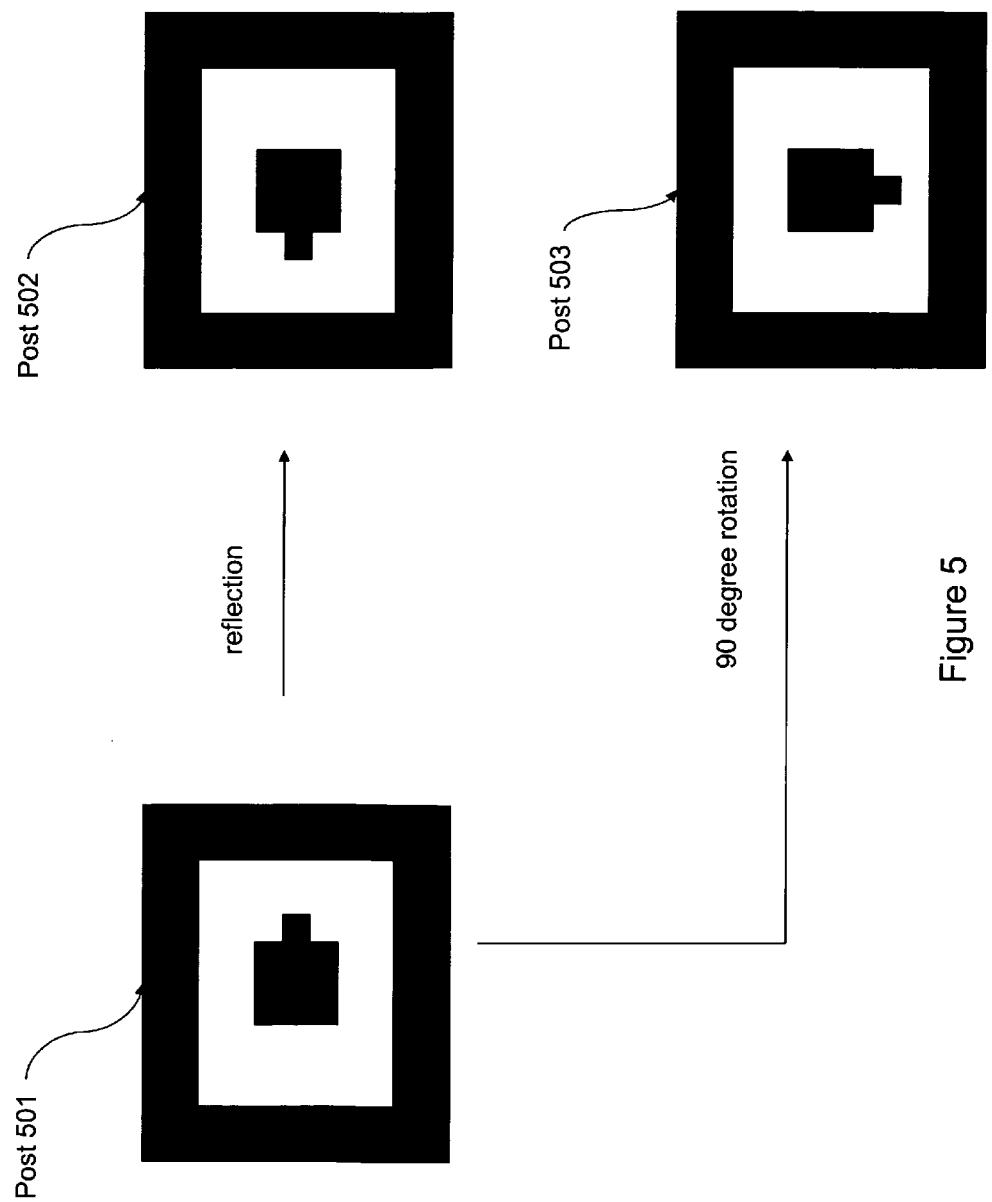
FIG. 5 shows a change to post A in FIG. 4.

There are 2 solutions. They involve symmetry breaking of the QR code. See the QR code in FIG. 1. One solution is to extend the default QR code to introduce an asymmetry. This could be at the post which we call A in FIG. 4. See FIG. 5. It shows just A. Post 501 shows the central square having a protrusion to the right. If a reflection occurs, as in FIG. 4, then we get Post 502. But if a 90 degree clockwise rotation occurs, we get Post 503. These can be computationally distinguished by the decoder.

However, a change to the default QR encoding would entail changes to all the encoders and decoders.

Another solution is to use colour. For example, the central square of post A might have a rectangular subset in a non-default foreground colour. While this is not shown in a diagram, it follows the 'style' of FIG. 5. The change to the central square is oriented so that reflection and rotation can be distinguished. The central square remains a square. And existing default coders and decoders remain unchanged.

The above examples are illustrative only. Other changes are equivalent. For example, colour changes could instead be made to the enclosing foreground rectangles that surround the central square. Or, instead of changing post A, a change might be made to one only of the other posts.

The common idea in all of these and other changes is to break the symmetry between the 2 outer posts. Another common idea is that the changes are not in the area of the code allocated to data storage or correction.

The ideas above for the QR code can also be extended to the Data Matrix code. Consider the example of the latter in FIG. 1. There could be a change to the shape of one only of the vertical or horizontal black borders.

8. Cellphone, Reader and ATM

In Section 3 of "559" we described multiple uses of the combination of a cellphone and an e-book reader ("Reader"), where these entities are connected in a wired or wireless manner and share resources. The cellphone has better wireless communication ability, while the Reader has a larger screen and more memory. None of these involved interacting with an Automated Teller Machine (ATM).

While in Sections 2.4 and 2.5 of "849" we described interactions between a user and her cellphone and an ATM using barcodes and its security camera. None of these involved the user having a Reader.

Figure 6:
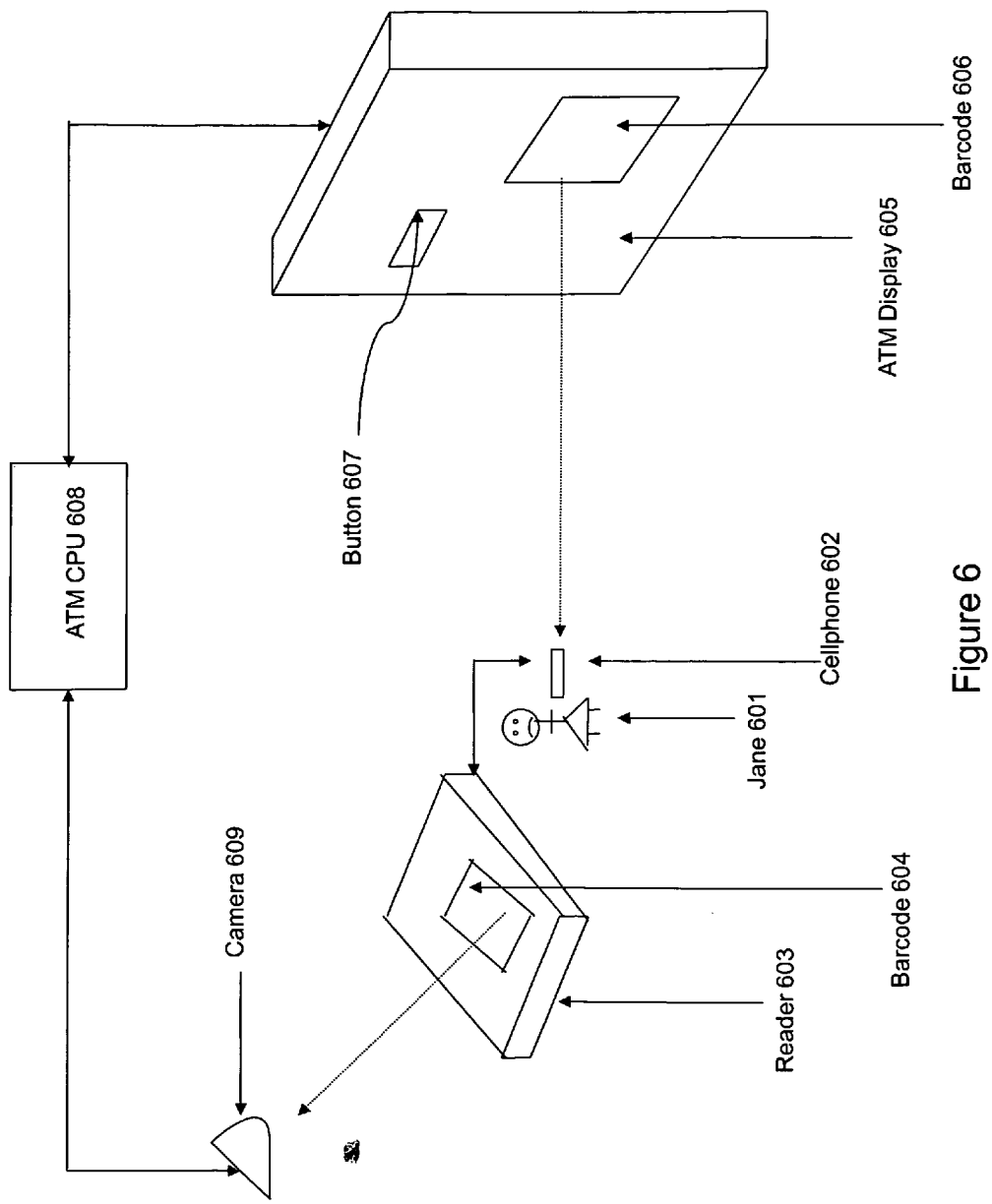
FIG. 6 shows Jane with a cellphone and Reader near an ATM.

In this section we extend the previous 2 paragraphs. We have a user with a cellphone and Reader interacting with an ATM with a camera. Consider FIG. 6. Jane 601 has Cellphone 602 and Reader 603. These are assumed to be in a wired or wireless communication with each other, as indicated by the connection between them in the figure. Jane and her devices are at ATM Display 605. Button 607 on the display represents the usual and multiple controls accessible to Jane, like several buttons and a keypad. For clarity, Button 607 is shown in place of these. Display 605 has a screen (not shown), in which Barcode 606 appears.

Cellphone 602 has a camera which is oriented so that it can image Barcode 606. There might be a holder apparatus near the Display, where Jane can put the cellphone, so that its camera can image the barcode.

ATM Display 605 is controlled by ATM CPU 608. The latter is assumed to also control Camera 609 and can access and analyse its images. Camera 609 might be the usual security camera which records the customers at the ATM. Or it could be another camera dedicated to the functionality described for it in this section. The camera is assumed to have pan-tilt-zoom (PTZ) ability that can be controlled by CPU 608. The bidirectional connection between CPU 608 and Camera 609 indicates this bidirectional information (control and data) flow.

When Jane is at ATM Display 605, she tells it, via Button 607 that she has a cellphone and Reader. Button 607 might also let her choose the barcode encodings that her Cellphone 602 and Reader 603 can decode or encode respectively. Because of the much greater storage capacity of the ATM, we assume that it can support (decode and encode) a wide range of encodings, that spans what typical Readers and cellphones in the marketplace are likely to use.

Jane places Cellphone 602 so that it can image Barcode 606. She also positions Reader 603, so that the Barcode 604 that it will display, or is already displaying, can be seen by Camera 609. The ATM environment might have a holder for the Reader, or a preferred location for it. The ATM CPU 608 then orients Camera 609 so that it focuses on Reader 603.

There could be a calibration step, where Reader 603 shows a test Barcode 604 for Camera 609 to image and for CPU 608 to decode. Likewise, there could be another calibration step where the ATM shows a test Barcode 606 for Cellphone 602 to decode. It is assumed that Camera 609 has enough resolution at the expected distance between it and Reader 603, to be able to resolve Barcode 604, at least at the latter's minimum data encoding, and preferably at higher encoding rates. There could be pattern recognition methods in CPU 608 to use the PTZ of Camera 609 to find Barcode 604 in an initial image and thence to zoom in on it.

For simplicity, there might be a pre-defined calibration pattern used in these steps. So for the first calibration, when CPU 608 decodes the image, it compares the result to the expected correct result. If there is disagreement, then this can be indicated to Jane on Display 605, who might take possible remedial steps. One of these is that if Barcode 604 was not at the lowest encoding rate, then Jane might lower the encoding, to produce larger rectangles in Barcode 604 and hence easier for CPU 608 to image and decode.

Likewise in the second calibration, Barcode 606 might be a known test pattern that Cellphone 602 decodes. If there is disagreement, then Jane could use Button 607 to inform CPU 608. One solution might be to reduce the encoding rate of Barcode 606.

A variant of the previous 2 paragraphs combines the calibration steps. So for example CPU 608 makes a test barcode that is shown in Barcode 606. This is imaged by Cellphone 602 and then transmitted to Reader 603, which then shows it in Barcode 604. Camera 609 images it and sends this to CPU 608, which decodes and compares it to the original. If this is the same, then the circuit is functional.

A variant on the previous paragraph is where a barcode test pattern is made by Cellphone 602 or Reader 603, and it then traverses the circuit and its return copy in Barcode 606 is compared to the original.

Calibrations could also test the use of colour in the barcodes. Of the 2 transmitters of the barcodes, and the 2 receivers, only Cellphone 602 is likely to be able to use (ie. image) colour. Some Readers cannot display colour. While Camera 609 might only record monochrome and ATM Display 605 might only display a monochrome barcode. If all 4 devices use colour, then the colour sensitivities should still be tested.

If not all 4 devices use colour, but the pair of Barcode 606 and Cellphone 602 or the pair of Barcode 604 and Camera 609 use colour, then partial tests of colour can be done. Note that the full looping tests can still be tried using black and white barcodes.

The calibrations might also test and possibly adjust the intensity of the Reader 603 screen, to a minimum intensity sufficient to let Camera 609 correctly decode Barcode 604. Useful because the screen output is the largest power drain on the Reader, and the Reader is a mobile device. There is less need to find a minimum intensity for the ATM Barcode 606 since the ATM has access to power lines.

For Cellphone 602 and Reader 603, the CPU of one of these might have primary responsibility for their joint interaction with the ATM.

If the connections are functional, then Jane and the ATM can now exchange data in a full duplex mode. The usages can be arbitrarily complex, where video barcodes could be played by both the Reader and the ATM.

One simple case is where the Reader to ATM connection functions as a control line, giving feedback to CPU 608 about the results of a data download that was via the ATM to cellphone connection. This feedback could be done in real time during the data download. The CPUs could cooperate in maximising the download bandwidth. Perhaps by increasing the data encoding rates to the maximum possible without generating unrecoverable errors.

Note that the full duplex interaction differs from that given in "782". The latter had the cellphone using its wireless phone ability to communicate with a web server. In this section, the entities in FIG. 6 do not use an external network, phone or Internet. We describe Jane having a cellphone and Reader because a cellphone is commonly used, and a Reader increasingly so.

Full duplex is also possible even if, say, the Reader 603 to Camera 609 connection cannot use colour, while the Barcode 606 to Cellphone 602 connection can. This means the full looping configuration using colour barcodes fails. But usages are still possible where only colour barcodes are transmitted by Barcode 606. Like the above Reader to ATM connection being a control line. Here the full duplex has different bandwidths along its half duplex lines. The control line is likely to need less bandwidth than the data line.

One extension is where instead of an ATM, there is another user, Dinesh, who has a cellphone (with a camera) and Reader. In a simple modification of FIG. 6, Dinesh's cellphone replaces Camera 609 and his Reader replaces Display 605.

An extension is where the ATM is replaced by a computer kiosk, for example, with an attendant display and camera.

An extension is where Jane's cellphone and Reader are combined into one device. For example, consider a cellphone in FIG. 6, positioned to record Barcode 606. Suppose the camera lens is on the opposite side of the phone from phone's screen. The screen could show a barcode and function as the Reader. In this case, the alignment requirement for Camera 609 will differ from the main case of a separate Reader. Also, this could require altering the default behaviour where when a cellphone takes a photo or video, the images appear on its screen. So that different barcodes could be shown on the cellphone screen to communicate back to the ATM.

There is an special exception to the latter. Where the default behaviour is used, so that ATM Camera 609 records the cellphone screen, which is showing what it images from Barcode 606. The ATM CPU then compares this to what it is transmitting, as a simple error checking or calibration method. This follows the earlier looping test, when the cellphone and Reader were separate devices.

An extension is where a Reader replaces the combination of Reader and cellphone. This stems from the above observation that the cellphone's phone functionality is largely unused. Hence a Reader with a camera (and attendant software) could be used in FIG. 6.

An extension is where Jane's cellphone and Reader are replaced by a laptop with a camera. The camera focuses on Barcode 606, while the laptop screen shows. Barcode 604. Given that laptops often have the camera and screen on the same side, Camera 609 will have to change its focus to image the laptop screen. (For some locations of Camera 609, this might not be possible.)

9. Wireless and Cable Television

In "782" and in FIG. 3 of this invention we assumed that when Website 306 gets an http query from Jane's cellphone, it knows that the query came from Screen 303. If Website 306 is the server for several instances of Screen 303, then for each instance it can assign a unique URL that is then shown in that screen's barcode. Now we consider when the screens are televisions getting their inputs from a standard wireless television signal or from a wired cable. Controller 305 may be taken to be the transmitter of the television signal.

Consider first the wireless case. In one limit, all the televisions get the same signal, with the same barcode. Then when Jane images the barcode, Website 306 does not know which television it came from. Hence Jane cannot directly cause a change in her television's display. But she can influence it in the statistical sense. Suppose the signal has a set of barcodes, as for a survey of preferences. Then based on the responses of all users, Controller 305 makes some decision about what to show later on all the televisions. Here, even if Controller 305 had access to extra information about the location of each user who imaged the barcode, it cannot by assumption customise what the users see.

Consider the cable TV case. Controller 305 can be taken to be the base or root level controller. Its output goes by cable to a hierarchy of distribution stations, with the lowest level connected directly to a user's television. Each of the latter stations could deliver a signal that includes a barcode, where the barcodes are unique to each recipient, where the uniqueness is across all the distribution stations. Thus Website 306 could uniquely map each user's query to a specific address.

Depending on the functionality of the distribution stations, it may be possible for Controller 305 to take the users' responses from Website 306 and turn provide some customisation. For example, suppose the "base" signal, that has no barcodes, remains the same across all recipients. Controller 305 could use Jane's response to design a set of barcodes that she will then see, where these barcodes are overlaid onto her signal by the distribution station that connects to her. Or this might be done at a neighbourhood level. Where all the users served by a leaf (lowest level) distribution station get the same set of barcodes, based on an averaging of their earlier responses.

10. Shaping a Barcode and URL

Suppose we have a barcode and we want to overlay onto its foreground rectangles a static image, which might be of a short text string or a simple symbol. We wish to use non-default foreground colours to draw this inside existing foreground rectangles, as described earlier. An example is FIG. 7. It shows Barcode 701. There is Symbol 702, a hollow triangle, where the sides of the triangle have some non-zero pixel width. Cover 703 is defined to be the rectangles of the encoding grid that are intersected by Symbol 702. Mathematically, Cover 703 is the covering set. Inner 704 is the rectangles inside Symbol 702. The rectangles shown with 'x' inside are "don't cares". They can be foreground or background. For simplicity, only a few of these are shown. Also, the sizes of the rectangles in FIG. 7 are likely to be larger than many actual instances. The rectangles here have been enlarged for clarity.

Previously we described how the symbol will be broken up because at some locations parts of it will be over background and so not displayed. Jane has to interpolate from the intersections of the symbol with the foreground. But if the foreground could be chosen to maximise its overlap with the symbol then interpolation is lessened or omitted altogether and Jane can more easily recognise the symbol. Reducing this cognitive load improves the effectiveness of the user interface.

Consider the special and important case where the data encoded is an URL. Imagine that the URL goes to a domain, xyz.com. The idea of this section stems from the observation that when an URL is normally encoded into a barcode, which then fixes the black and white patterns of the barcode, the URL is taken to be constant. But in general many URLs (that are not necessarily encoded into barcodes) are long strings of ascii symbols usually meaningful only to the web server that decodes the URL. When such an URL appears in the address bar of a browser, much of the human understandable portion is restricted to the Internet domain name portion.

In this section, the constant inputs are taken to be a symbol to be overlaid and the domain of the URL, like xyz.com. The full URL is the output of this section's method. To the largest extent possible, the characters in the URL are considered as degrees of freedom, to be varied.

Define Symbol 702 as the starting condition, along with a given encoding.

Pick an encoding level. This defines the grid of rectangles in FIG. 7. Find Cover 703. Let j be the number of rectangles in Cover 703.

Define k to be the number of foreground rectangles in Cover 703, for a given URL (and hence barcode pattern). J is the upper bound on k. The objective is to pick a URL that maximises k.

We assume that the encoding can encode lower and upper case letters. If not, then the steps below that refer to case sensitivity can be skipped.

Consider a URL like "http://xyz.com/data/JiO3-ae3". The domain portion is not case sensitive. So while 'xyz.com' is a fixed address, it can appear as e.g. 'xYz.COM' in a URL. Every letter in the domain of a URL generates a factor of 2 in cases. Suppose also that the URL goes to the default port 80. This can be omitted or explicitly written. Which is another factor of 2. Also, the string "http" can be case varied.

Another possible source of variation is to include or omit the "http://". The reasoning is that in most browsers, if this is omitted, the browser will prepend it by default. A complication arises because the barcode is meant to be decoded by software on a phone that takes a photo of it. Because the barcode method could (probably) encode arbitrary data, then when the software decodes it and gets ascii and then sees that the string starts with "http://", it knows that this is a URL and so the software starts a browser and loads it with this as the address. If the browser does not see "http://" (or any other similar protocol) then it might not have enough information to know that it should start a browser, and opposed to just having decoded some ascii string. Hence the protocol might be explicitly retained. Or it might be omitted, if it can be anticipated that the decoding phone's software is likely to have heuristics (say) that bring up a browser anyway with the decoded string as the URL.

While 'xyz.com' is assumed to be the fixed destination, it can often be assumed that subdomains to the left of it are variable. Because the owner of a base domain can define an essentially arbitrary number of subdomains. The most common case is 'www.xyz.com' which maps to 'xyz.com'. Each subdomain's letters can be written in upper or lower cases.

To the right of the domain section is more variability. Ascii symbols can be used in upper and lower case, which is 52 choices, plus the ten digits, giving 62 choices per symbol position. (Plus a few other notational symbols.) While the number of characters in an URL can be over 100.

The above discussion of the symbols inside a URL restricted these to ascii. If Unicode extensions to URL notation are allowed, this could extend the possible symbol space and thus give even more degrees of freedom in crafting a URL.

An implementer might choose not to have variable cases in the domain, as this could be considered unsightly by Jane when she sees this in her browser's address bar. But as shown above, the rest of the URL affords considerable flexibility in itself. An empirical inspection of URLs found while surfing the Web will likely show (in 2011) that the part of the URL to the right of the domain often has upper and lower case letters.

Using the above guidelines we pick a trial URL and make a barcode and find k. A heuristic might be to pick a fixed number of characters to be present to the right of the domain. Then randomly choose a character in each position.

The method also uses knowledge of Cover 703 to speed up computations. For a given encoded URL, each rectangle can be considered as a bit; 1 for foreground and 0 for background. Consider an example of a specific rectangle, before any URL is assigned to the barcode. Suppose that the rectangle is in Cover 703 and it will be bit 6 in a byte of the 14-th character, and that the only other bit in the byte that is also in Cover 703 is bit 0. (It is trivial to extend this to the case of a character taking more than one byte.) Then initially the 14-th character has a binary value (x, 1, x, x, x, x, x, 1), where the x's denote don't care conditions. By repeating this across all the rectangles (bits) in Cover 703, we get constraints on the possible values of characters in the URL. Which reduces the search space.

An encoding might take the input string and copy it 2 or more times to different parts of the barcode, as part of an error correction method. So different rectangles in Cover 703 might point to the same bit in the same character. Since this means that the bit is set twice (idempotent) there is no problem.

But a contradiction can arise if some rectangles not in the cover are required to be 0 (background). Consider the example in FIG. 7. See the rectangles inside Symbol 702. The rectangles are not considered part of the symbol. For greater contrast, it could be desired that the interior be in the background, as much as possible. Possibly also for rectangles outside Cover 703 that are next to a rectangle (desired value 1) in the cover. So in a binary representation, the rectangle is 0. But another rectangle, that is in the cover, might map to the same bit of the same character, and thus have desired value 1.

One resolution is that the ability to have the symbol over foreground rectangles (easier interpolation) overrides a desire for greater contrast. Hence the rectangle outside the cover gets assigned the value 1, instead of the original 0 and instead of the default x applying to most rectangles outside the cover.

Consider again the example of where the URL is for xyz.com. Suppose the initial test case is "http://xyz.com/ . . . " where there are specific choices of characters after the domain. Each character position in the URL maps to several connected sequences of rectangles in the barcode. We say connected sequences because each character is a set of bits, and the set might/will be replicated as connected rectangles.

Suppose the above front of the string is mapped to specific rectangles. Some of these could overlap with the symbol, but force the rectangles to be 0 instead of 1. This is not restricted to the case where the character is represented as ascii, and the bits (from that ascii representation) in the character's byte are then placed in and replicated in the barcode. Regardless of whatever mapping is made from a character to its binary representation, most characters will end up with a representation with both ones and zeros. And it is the case when one of these zero bits maps to a rectangle in the cover that is (relatively) undesired.

This could happen even if the case of the character is varied. One measure is to prepend dummy subdomains that will overlap with the symbol and set as many of the rectangles to 1 as possible. This could be done while temporarily ignoring the rest of the URL. When values have been found for the domain part of the URL, the right part of the URL can then be searched for.

In the latter part, there could be desired values, like an ID of the screen that the barcode is shown on, or perhaps equivalently an ID that maps to the location of the barcode, if this is meaningful. Also, there could be several barcodes on the same display, and there might be an id that indicates which was picked. Often for these cases, the usual syntax in the URL is 'a=b', where a maps to a variable and b to its value, where both of these could be several characters. A and b might be fixed in value, though possibly allowing for the case to vary on either side of the equals sign. Suppose a given 'a=b' overlaps Symbol 702 such that a rectangle under the symbol is assigned 0 instead of 1. And varying the case of the characters does not change this. One answer is to prepend dummy 'c=d' strings, where these can be freely manipulated so that the bits in the string that are also in the cover have value 1.

If there are several real 'a=b' pairs that need to be in the URL, these can be incrementally placed by the method of the previous paragraph. Another degree of freedom, if it is needed, is that the relative ordering of the real 'a=b' pairs in the final URL should be irrelevant. If it is relevant, the web server that parses the incoming URL can be recoded to make the ordering irrelevant. Hence, the 'a=b' pairs might be reordered as necessary, to help arrive at an optimal cover for the symbol. Here, dummy pairs could still be inserted as needed.

The URL might have a section immediately to the right of the domain, that has a directory structure, like "/test/bin/". These might be able to be renamed, for extra degrees of freedom. Though this could involve recoding sections of the web server's parser.

In general, if the URL has parts right of the domain and directories that are not of the 'a=b' form, but which need to be preserved, then the steps of the previous recent paragraphs can be applied, to insert dummy arguments, while leaving the necessary parts for a web server to later parse.

So the problem of finding a desired URL can be decomposed into smaller more tractable problems.

One method to increase the size of the cover that is in the foreground is to investigate repositioning the symbol in the barcode, to the extent that this can be done. For example, suppose the symbol takes up the full horizontal width of the barcode, but not the full vertical size. Thus the symbol's position in the barcode could be adjusted vertically. The drawback is that typically any symbol might be wanted to be centered in the barcode. But if this can be relaxed, then adjustment is an extra optimising step.

Note that for QR codes, a minor complication is that a mask is applied to break up any large contiguous areas of single colour that could confuse decoding. So for a given symbol, there may be an upper limit to the number of its covering rectangles that will be in the foreground, where this upper limit is less than the maximum number of rectangles in the cover. When iterating over some steps in this section, this constraint may need to be considered. Otherwise iterations could take too long (or even not converge).

The previous paragraph's remarks might also pertain to other encodings that use similar masks.

This section has used the idea of a symbol to be written onto foreground rectangles in some non-default foreground colour. It could also apply to where the symbol is simply meant to be inferred from the pattern of the foreground rectangles.

Most of this invention related to barcodes on an electronic display. This section could also be applied to a barcode printed on a fixed medium.

The computational effort of this section need not be done in real time, in some or many applications. Suppose the barcode is to be printed on a fixed medium. Then real time is meaningless. This expression implicitly refers to a situation where the image [barcode] appears on a variable display, not a fixed display. For the latter, it might be known a priori what the original URL is and what the symbol is. Hence the crafted URL can be precomputed well before the barcode appears on the display. The only likely time constraint arises when there is an incoming flow of URLs, and the time to adjust each of these is limited to the time before the next URL needs to be shown in some form.

This section referred to the URL that will appears in Jane's cellphone browser's address bar. As in why it might not be desirable for the domain part to be in upper case. But consider a URL that has upper case parts of its domain, as well as other parts to the right that are created according to rest of the section. The web server that gets this URL might as a redirector after is parses the URL. It could redirect to a simpler, cleaner looking URL, while still using the information from the original URL that came from the barcode.

This could be extended by the owner of the web server and its domain having other domains that exist as redirectors. Or perhaps using well known redirector domains (e.g. bit.ly). These other domains give more flexibility for this section, by introducing degrees of freedom for making URLs.

The steps in this section has referred to http. Other Internet protocols like https, ftp and ftps are also possible in the URL to be shaped.

A question can arise about the utility of this section. Is the improvement in pattern recognition enough to justify the computation effort? For some applications, there will be no need for this section. But for other applications and perhaps for companies wanting fine grained control over the display properties of their ads or logos, it can be useful.

11. Making a Barcode on a Public Display

Consider again FIG. 3. Now suppose that Jane 301 is walking up to Screen 303 in some publicly accessible area, and there is no Barcode 304 on the screen. She wants to interact publicly with the screen. Possibly in the ways suggested earlier, like in a single or multiplayer game that nonplayers nearby can observe. If interaction is possible, it is via a cellphone. There might not be any control buttons for Screen 303 that are accessible to her Perhaps from her previous interactions with this screen, or others like it, she expects that this is possible. She uses cellphone 302, which is assumed to have some geolocation ability. Preferably this uses GPS. On the phone she brings up a browser and goes to a well known website. The phone is assumed to have Internet access.

The website is equivalent to a specialised search engine. The website is considered a known, good website. She gives it her phone's location. Preferably programmatically. She does some action on her phone that transfers her location to the website, without having to manually type it. Also, the message includes a random string generated by the phone, and perhaps a label, like a nickname. The website searches for the closest screen to her location. There could be several. Assume there is at least one. Also suppose that the (search) website knows the addresses of the Website 306s that are associated with each Controller 305.

The search website sends to these Website 306s a message that has the random string and the optional label. Website 306 makes a structured message with these values, excluding the label. The message might use XML, e.g. <m><random>... </random> <url> ... </url> </m>. Here the <url> field is a URL of Website 306. This has an argument that uniquely identifies Screen 303 to Website 306, since in general Website 306 might have several screens.

The message and label is sent to Controller 305, which makes a barcode of the message and sends it and the label to Screen 303. The barcode becomes Barcode 304 and the label is shown near it. Or perhaps overlaid, in the manner described earlier.

When Jane sees Barcode 304 and the label, she recognises the label. The label is recommended, because otherwise the appearance of the barcode might have been triggered by another user, near Screen 303 or another screen controlled by Website 306. Jane images the barcode. Her phone's software extracts the random number and compares it to the original. If they are equal, then it starts a browser with the URL of Website 306 taken from the barcode. Jane can now interact with Website 306 in various ways on her phone, with aspects of that interaction being shown on Screen 303.

One advantage of this section is that Jane might be unwilling to interact with an unknown Screen 303 with a. Barcode 304 that goes to an arbitrary Website 306. For example, in this invention, we have not described Website 306 as needing payment for its interactions. If it does, then Jane could be reluctant to electronically pay an unknown website. Whereas by first contacting the known search website, the latter could offer a service by vetting the Website 306s.

12. IP Address and HTML Form

Consider when a barcode wraps an URL. Earlier we described how in FIG. 3 when Website 306 gets the URL, it could find the appropriate Controller 305 to send a new image (including barcode) to, under the assumption that Website 306 has several Controllers. This can be generalised to the case that in the geometry of FIG. 3, if Controller 305 has an Internet address, then the URL in Barcode 304 has that address encoded. This has the advantage of reducing the effort Website 306 has in deciding which controller to send a signal to, when it gets a query from Jane's cellphone. Effectively to Website 306, the combination of Controller 305, Screen 303 and Barcode 304 is now encapsulated into one modular entity.

A barcode can encode an HTML form. The latter has its action attribute set with the value of an URL to which the form's values are submitted. Hence when Jane takes a photo of the barcode, her phone brings up a browser and displays the HTML form, showing the attributes and any values perhaps already filled out in the barcode. The barcode can be on a fixed display, like a magazine page. The use of a form instead of an URL gives flexibility to the designer to let Jane more easily make choices.

Now suppose the barcode is on a variable screen. So we have FIG. 3. Following the steps of 2 paragraphs earlier, the URL can encode the IP address of Controller 305.

If we regard Barcode 304 as a control button for Screen 303, then encoding a form lets Jane adjust many more parameters of the screen than just picking an URL, since the latter amounts to essentially a unary or binary input. The binary input is where Website 306 maintains the state of Barcode 304, with the latter regarded as a binary button. The form avoids the space constraint of needing several button barcodes on Screen 303.

13. Other Extensions

We described how the default foreground could be modified by the use of non-default colour. An extension is where a similar change could be made to the background. The choices of non-default background colours would be made so that these are widely separated from each other and from the non-default foreground colours, as well as from the default foreground and background.

With both foreground and background being modifiable, it is possible for a given text or graphic to appear across both types of rectangles. Whereas before, it would only appear on the foreground rectangles.

The scenarios in this invention thus far usually assumed that Jane cannot make physical contact with the display device. But she may be, in some contexts. One would be when she is near some type of Automated Teller Machine (ATM). Especially if she is interacting with it and the ATM transmits information to her cellphone via barcodes. This uses our invention, "849", where the emphasis was on privacy or anonymity for Jane. The barcodes on the ATM screen could be just using the default foreground and background colours. But there might be an option that Jane can pick by pressing a button near the screen, or touching a portion of the screen, whereby the barcodes will use colour to add more information bandwidth. This assumes that Jane's cellphone can decode the colour information.

In earlier descriptions of several users interacting at an electronic screen, it was assumed that they would likely perform most of the interactions on their cellphones, after they made the initial connection to the server of FIG. 3, using the cellphones. One variant is where the web server also makes available the screen display on a web page for free or restricted access on the Internet. Hence an interactive game, for example, could be played by some users logging into the web server from desktop computers, as well as being played by other users (with their cellphones) at the main public screen.

I claim:

1. A method comprising:
providing a screen; and
providing a processor configured to display images on the screen,
wherein:
the images displayed on the screen comprises time varying images including a barcode and are adapted to be imaged by a camera,
wherein the processor is configured to display text and/or graphics using colors distinct from the colors of the barcode so that the text and/or graphics are distinguishable from the barcode, the barcode is adapted to be captured and decoded by a cellphone, and
the barcode is adapted to be viewed by one or more users, the one or more users capable of discerning the text and/or graphics placed on the foreground or background of the barcode.

2. The method according to claim 1, wherein the barcode encodes a uniform resource locator (URL) and the processor is configured to decode the barcode and display the barcode having text corresponding to the URL that scrolls across the barcode displayed on the screen.

3. The method according to claim 1, wherein the processor, when displaying text on the barcode, is configured as follows:
if the text is in a European language, the processor is configured to display the text scrolling from right to left across the barcode displayed on the screen;
if the text is in Arabic, the processor is configured to display the text scrolling from left to right across the barcode displayed on the screen; and
if the text is in traditional Chinese, the processor is configured to display the text scrolling from bottom to top across the barcode displayed on the screen.

4. The method according to claim 1, wherein the screen comprises a row of barcodes, and the processor is configured to display the text or graphics scrolling across the row of barcodes.

5. The method according to claim 1, further comprising:
configuring a cellphone to image and decode the barcode via a cellphone camera thereby obtaining an encoded URL, and
querying a website corresponding to the encoded URL,
wherein:
the cellphone is configured to query the website,
the website is configured to increment a counter corresponding to a number of times the barcode was imaged and decoded resulting in the query of the website,
the website is configured to communicate with the processor the counter, and
the processor is configured to display on the barcode the counter using non-default foreground or background colors.

6. The method of claim 5, wherein querying of the website also triggers a sequence of tasks on the website; and the website communicates a progress to the processor corresponding to a completion of the sequence of the tasks, the processor configured to display the progress via a progress bar.

\* \* \* \* \*